(12) United States Patent
Reinhardt et al.

(10) Patent No.: US 9,025,810 B1
(45) Date of Patent: May 5, 2015

(54) INTERACTIVE GEO-REFERENCED SOURCE IMAGERY VIEWING SYSTEM AND METHOD

(75) Inventors: Tilman Reinhardt, Woodside, CA (US);
Stephane Lafon, Sunnyvale, CA (US);
Andrew Szybalski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1077 days.

(21) Appl. No.: 12/754,066

(22) Filed: Apr. 5, 2010

(51) Int. Cl.
*G06K 9/00* (2006.01)

(52) U.S. Cl.
CPC .................................. *G06K 9/00624* (2013.01)

(58) Field of Classification Search
CPC ........................... G08G 1/0969; G01C 21/3679
USPC ........................................................ 382/100
See application file for complete search history.

(56) References Cited

U.S. PATENT DOCUMENTS

| | | | | |
|---|---|---|---|---|
| 5,247,356 | A * | 9/1993 | Ciampa | 348/144 |
| 6,292,215 | B1 * | 9/2001 | Vincent | 348/169 |
| 6,314,370 | B1 * | 11/2001 | Curtright | 701/412 |
| 7,197,170 | B2 * | 3/2007 | Dwyer et al. | 382/128 |
| 7,466,244 | B2 * | 12/2008 | Kimchi et al. | 340/995.1 |
| 7,734,116 | B2 * | 6/2010 | Panabaker et al. | 382/284 |
| 7,777,648 | B2 * | 8/2010 | Smith et al. | 340/995.1 |
| 7,778,491 | B2 * | 8/2010 | Steedly et al. | 382/294 |
| 7,889,948 | B2 * | 2/2011 | Steedly et al. | 382/294 |
| 7,920,072 | B2 * | 4/2011 | Smith et al. | 340/995.1 |
| 8,159,524 | B2 * | 4/2012 | Wilson et al. | 348/42 |
| 8,160,400 | B2 * | 4/2012 | Snavely et al. | 382/305 |
| 8,514,266 | B2 * | 8/2013 | Wilson et al. | 348/42 |
| 8,593,518 | B2 * | 11/2013 | Schultz et al. | 348/144 |
| RE44,925 | E * | 6/2014 | Vincent | 348/333.02 |
| 2003/0014224 | A1 | 1/2003 | Guo et al. | |
| 2003/0110185 | A1 * | 6/2003 | Rhoads | 707/104.1 |
| 2003/0158655 | A1 * | 8/2003 | Obradovich et al. | 701/207 |
| 2006/0098010 | A1 * | 5/2006 | Dwyer et al. | 345/424 |
| 2006/0195475 | A1 * | 8/2006 | Logan et al. | 707/104.1 |
| 2006/0238379 | A1 * | 10/2006 | Kimchi et al. | 340/995.1 |
| 2006/0238380 | A1 * | 10/2006 | Kimchi et al. | 340/995.1 |
| 2006/0238381 | A1 * | 10/2006 | Kimchi et al. | 340/995.1 |
| 2006/0238382 | A1 * | 10/2006 | Kimchi et al. | 340/995.1 |
| 2006/0238383 | A1 * | 10/2006 | Kimchi et al. | 340/995.1 |
| 2006/0241859 | A1 * | 10/2006 | Kimchi et al. | 701/208 |
| 2006/0241860 | A1 * | 10/2006 | Kimchi et al. | 701/208 |
| 2007/0024612 | A1 * | 2/2007 | Balfour | 345/419 |
| 2007/0110338 | A1 * | 5/2007 | Snavely et al. | 382/305 |

(Continued)

OTHER PUBLICATIONS

Microsoft Inc., "What is Photosynth? - About - Photosynth", http://photosynth.net/about.aspx, pg. 1-2.*

(Continued)

*Primary Examiner* — Gandhi Thirugnanam
(74) *Attorney, Agent, or Firm* — Lerner, David, Littenberg, Krumholz & Mentlik, LLP

(57) ABSTRACT

The present invention pertains to geographical image applications. A user may transition between nadir and street level imagery using unstitched oblique imagery. Oblique images offer a rich set of views of a target location and provide a smooth transition to or from other images such as nadir photographs taken by satellites or street level photographs taken by ground level users. Using unstitched oblique images avoids artifacts that may be introduced when stitching together one or more images. This allows an application to display images to a user and create the illusion of three dimensional motion.

20 Claims, 20 Drawing Sheets

(56) References Cited

U.S. PATENT DOCUMENTS

| | | | |
|---|---|---|---|
| 2007/0210937 A1* | 9/2007 | Smith et al. | 340/995.1 |
| 2007/0237420 A1* | 10/2007 | Steedly et al. | 382/284 |
| 2007/0265781 A1 | 11/2007 | Nemethy et al. | |
| 2007/0273558 A1* | 11/2007 | Smith et al. | 340/995.1 |
| 2008/0027985 A1* | 1/2008 | Kasperkiewicz et al. | 707/104.1 |
| 2008/0028341 A1* | 1/2008 | Szeliski et al. | 715/854 |
| 2008/0069480 A1* | 3/2008 | Aarabi et al. | 382/305 |
| 2008/0221843 A1* | 9/2008 | Shenkar et al. | 703/1 |
| 2008/0231700 A1* | 9/2008 | Schultz et al. | 348/144 |
| 2009/0073191 A1* | 3/2009 | Smith et al. | 345/629 |
| 2009/0092277 A1* | 4/2009 | Ofek et al. | 382/100 |
| 2009/0327024 A1 | 12/2009 | Nielsen et al. | |
| 2010/0079501 A1 | 4/2010 | Ikeda et al. | |
| 2010/0085350 A1* | 4/2010 | Mishra et al. | 345/419 |
| 2010/0118025 A1* | 5/2010 | Smith et al. | 345/418 |
| 2010/0232770 A1 | 9/2010 | Prestenback et al. | |
| 2010/0238164 A1* | 9/2010 | Steedly et al. | 345/419 |
| 2010/0289826 A1 | 11/2010 | Park et al. | |
| 2010/0295971 A1 | 11/2010 | Zhu | |
| 2010/0309167 A1 | 12/2010 | Nam | |
| 2011/0090337 A1* | 4/2011 | Klomp et al. | 348/144 |
| 2011/0091076 A1 | 4/2011 | Schultz et al. | |
| 2011/0212717 A1* | 9/2011 | Rhoads et al. | 455/420 |
| 2011/0244919 A1* | 10/2011 | Aller et al. | 455/556.1 |
| 2011/0310088 A1* | 12/2011 | Adabala et al. | 345/419 |
| 2011/0312374 A1* | 12/2011 | Chen et al. | 455/556.1 |
| 2012/0072863 A1 | 3/2012 | Akifusa | |
| 2012/0200702 A1* | 8/2012 | Wilson et al. | 348/144 |
| 2013/0104076 A1 | 4/2013 | Cristescu et al. | |
| 2013/0222385 A1* | 8/2013 | Dorsey et al. | 345/427 |
| 2013/0321290 A1 | 12/2013 | Oh et al. | |

OTHER PUBLICATIONS

Bing Maps Tile System, http://msdn.microsoft.com/en-us/library/bb259689(v=MSDN.10).aspx, retrieved from the Internet on Apr. 5, 2010, 13 pages.

Working with 3D, http://msdn.microsoft.com/en-us/library/cc451896(v=MSDN.10).aspx, retrieved from the Internet on Apr. 5, 2010, 17 pages.

Importing and Mapping Data, http://msdn.microsoft.com/en-us/library/bb259689(v=MSDN.10).aspx, retrieved from the Internet on Apr. 5, 2010, 17 pages.

"Photo Tourism Exploring Photo Collections in 3D" [online], Retrieved Jul. 25, 2013, <phototour.cs.washington.edu>, 2 pages.

Avanish Kushal, Ben Self, Yasutaka Furukawa, David Gallup, Carlos Hernandez, Brian Curless and Steven M. Seitz, Photo Tours, 2012, 8 pages.

Noah Snavely, Rahul Garg, Steven M. Seitz, and Richard Szeliski, Finding Paths Through the Worlds's Photos, 2008, 11 pages.

Noah Snavely, Steven M. Seitz, and Richard Szeliski, "Photo Tourism: Exploring Photo Collections in 3D" Power Point presentation, 2006, 79 pages.

Toyama, K. et al., "Geographic Location Tags on Digital Images," Proceeding Multimedia '03 Proceedings of the eleventh ACM International Conference on Multimedia, pp. 156-166.

Foy, Laura, Channel 9, "First Look: Streetside in Bing Maps", Posted: Dec. 2, 2009, <http://channel9.msdn.com/blogs/laurafoy/first-look-streetside-in-bing-maps>.

Foy, Laura, Channel 9, "First Look: Streetside in Bing Maps", Posted: Dec. 2, 2009, Video, <http://ecn.channel9.msdn.com/o9/ch9/0/5/0/3/0/5/StreetSide_ch9.wmv>, (a copy of the video can be access through this web link).

* cited by examiner

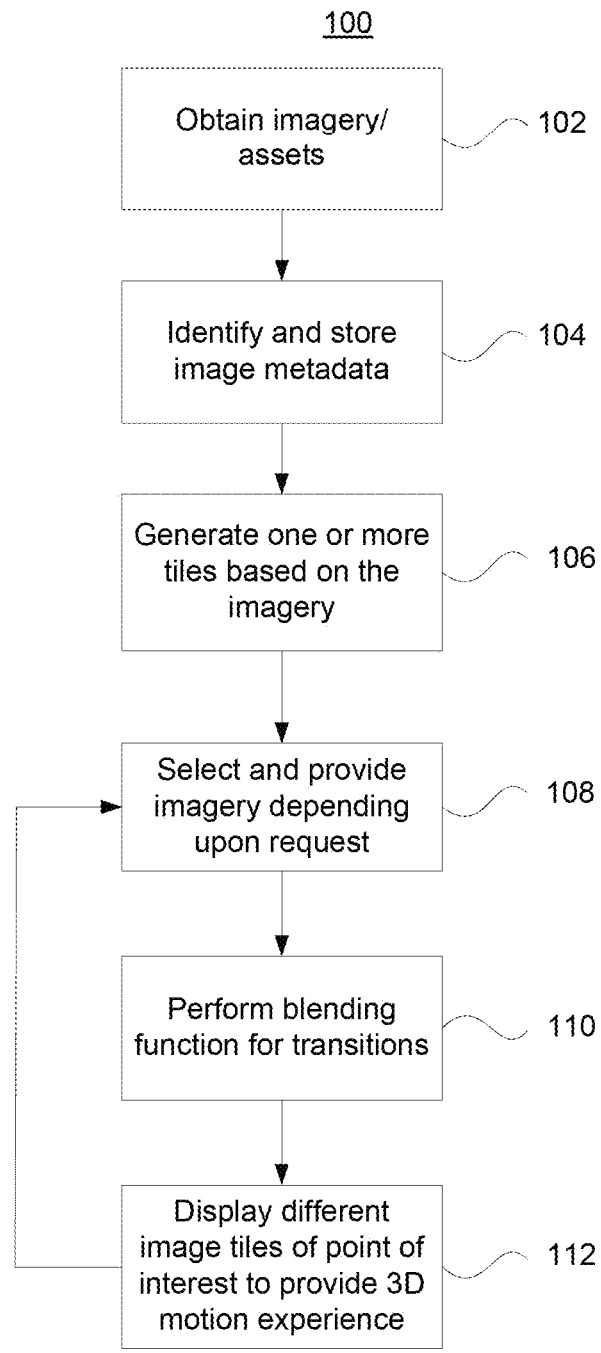

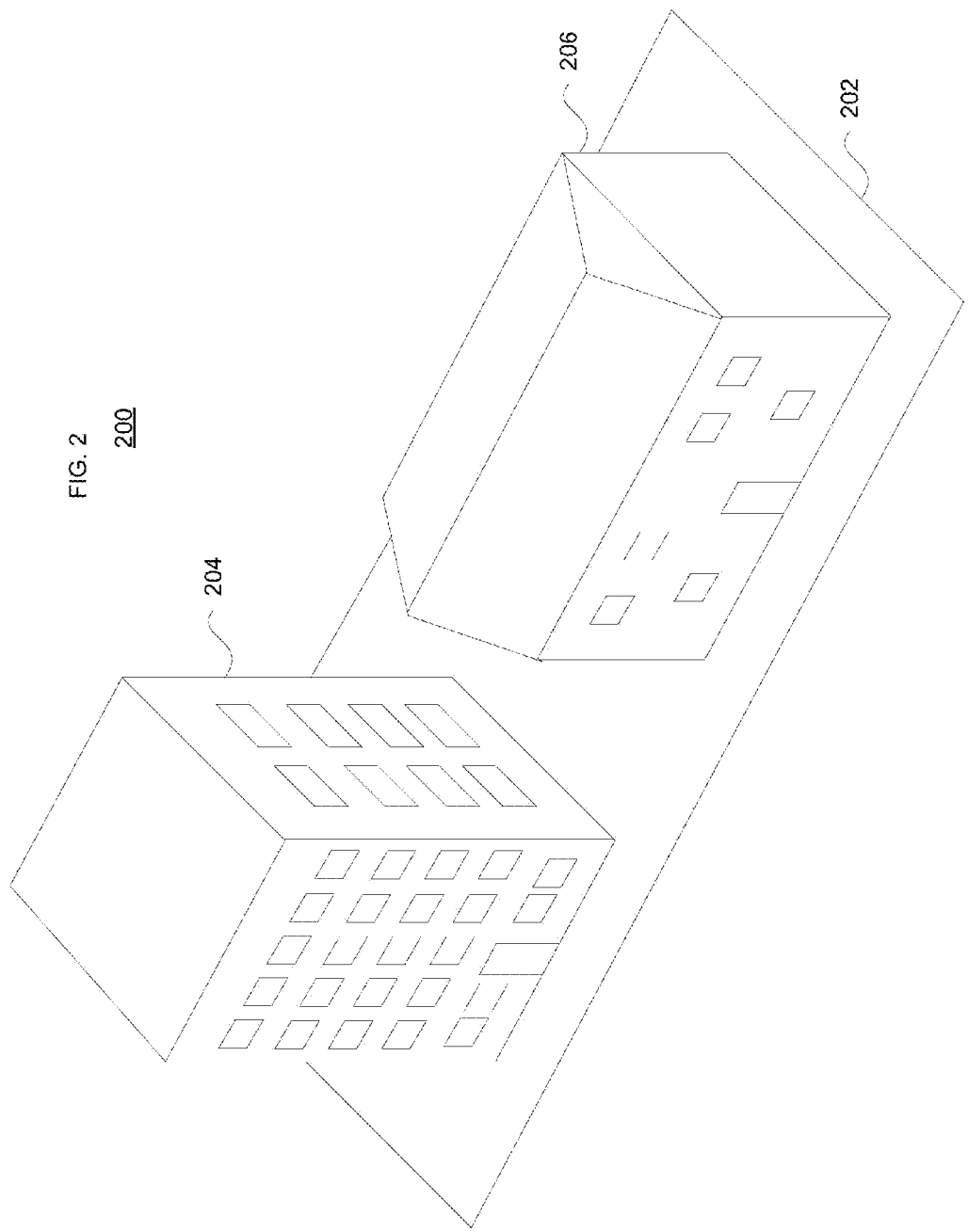

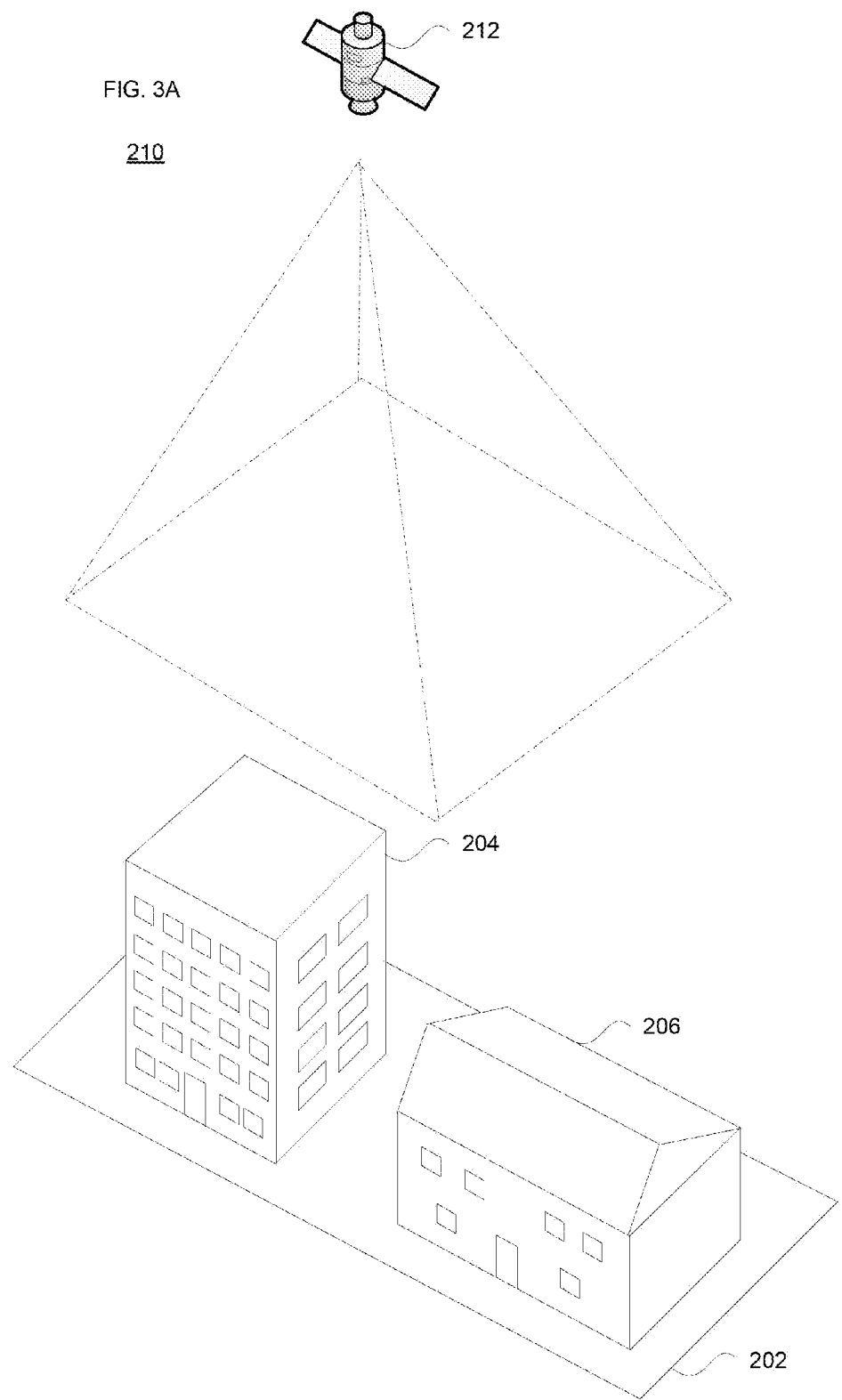

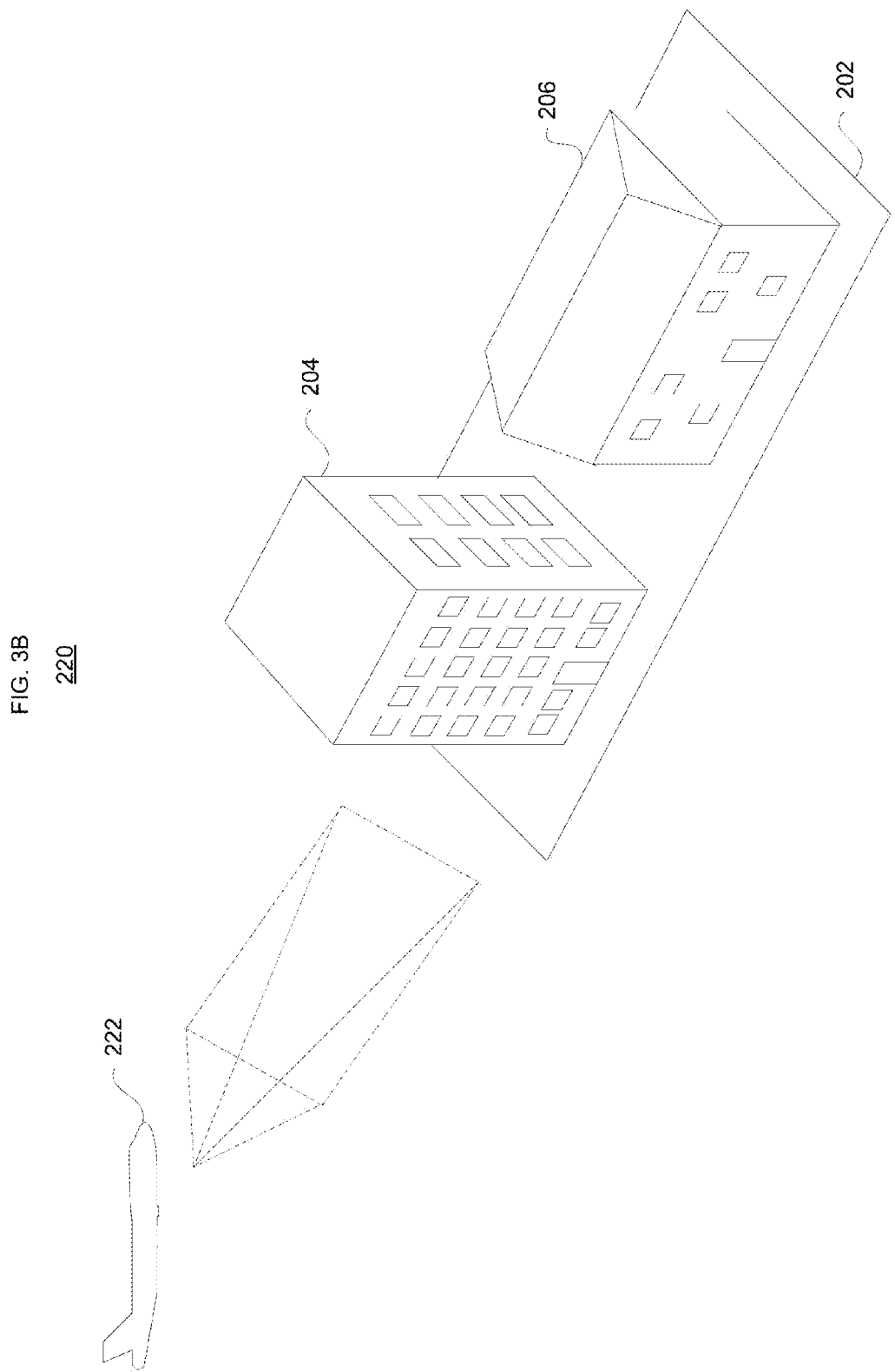

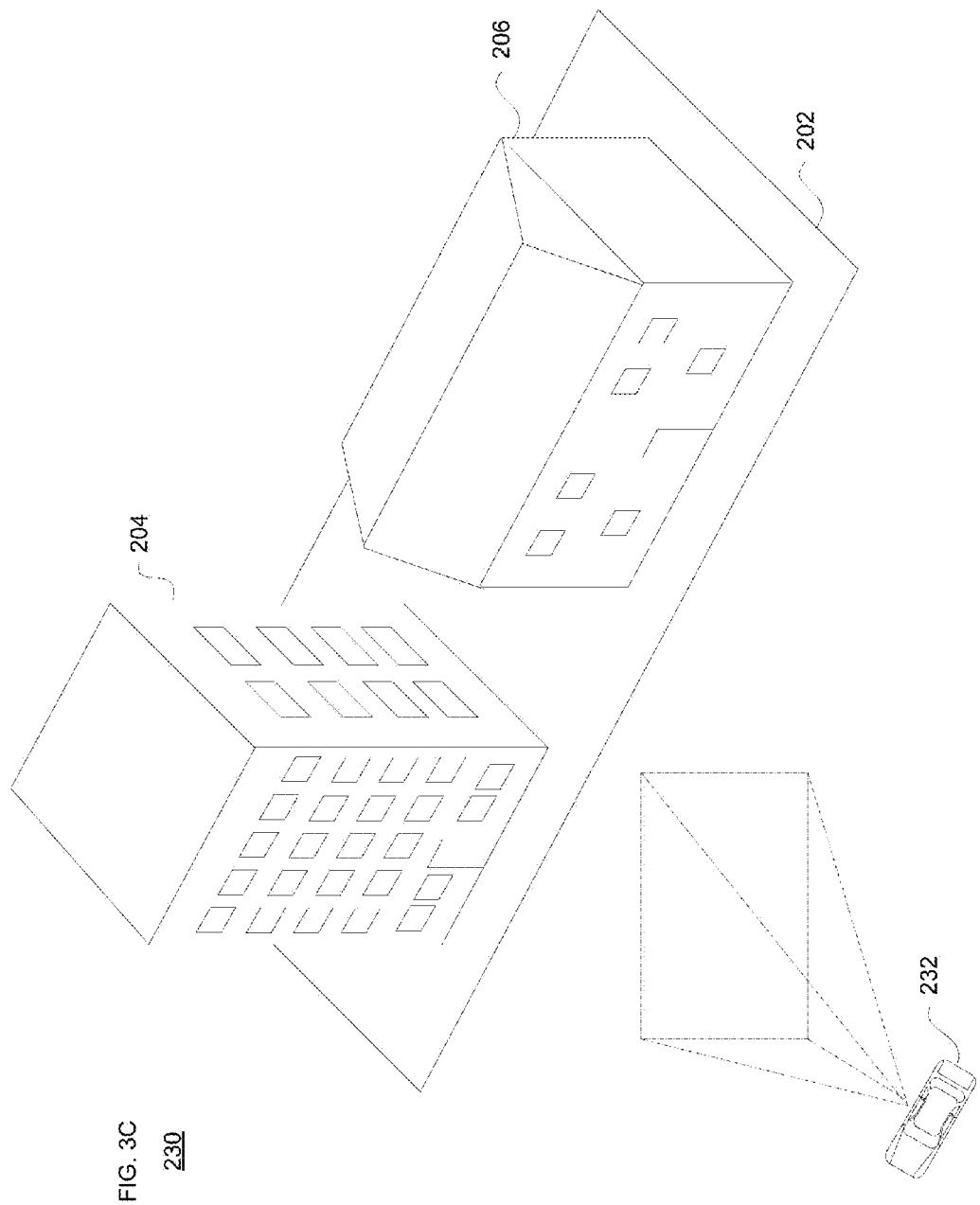

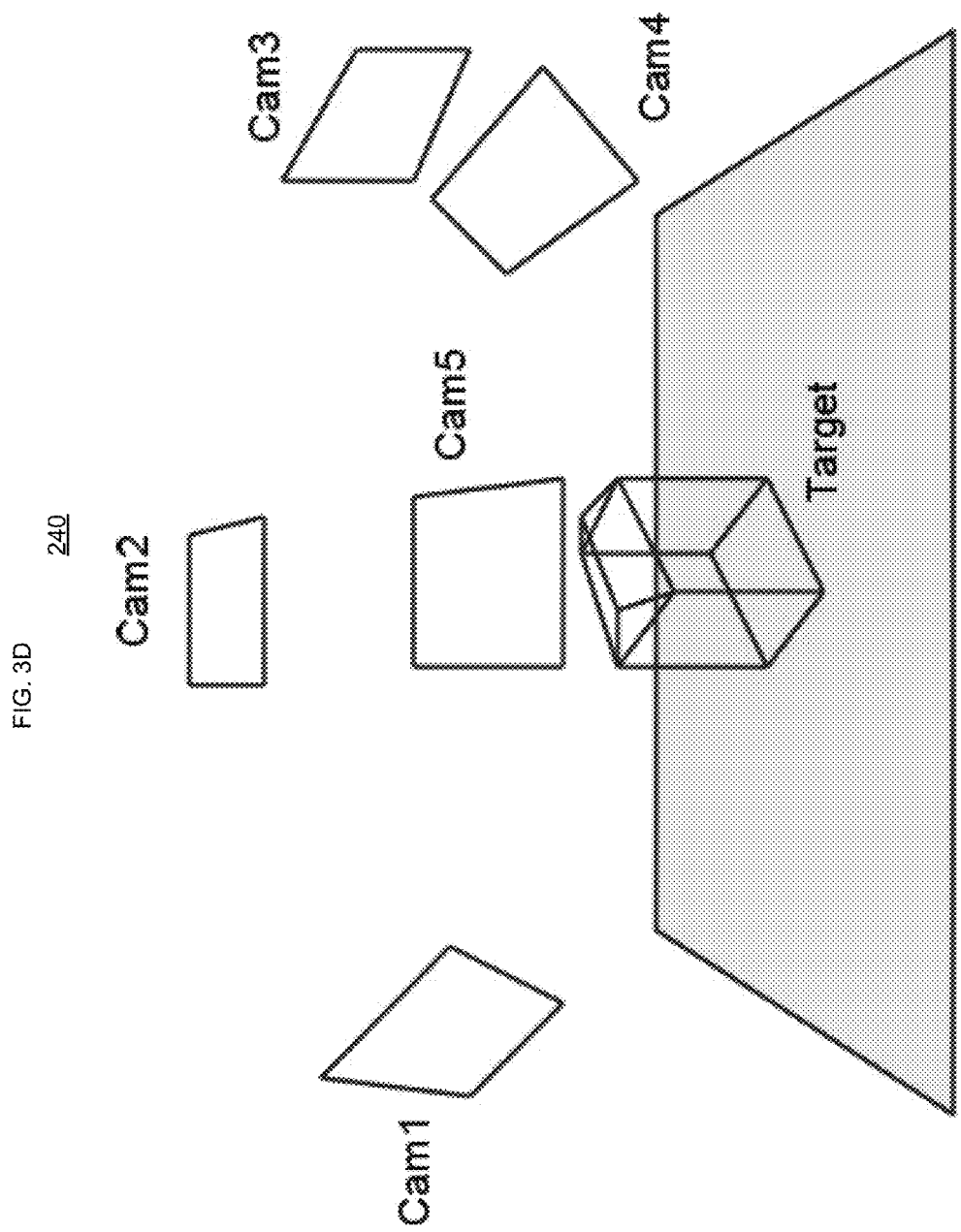

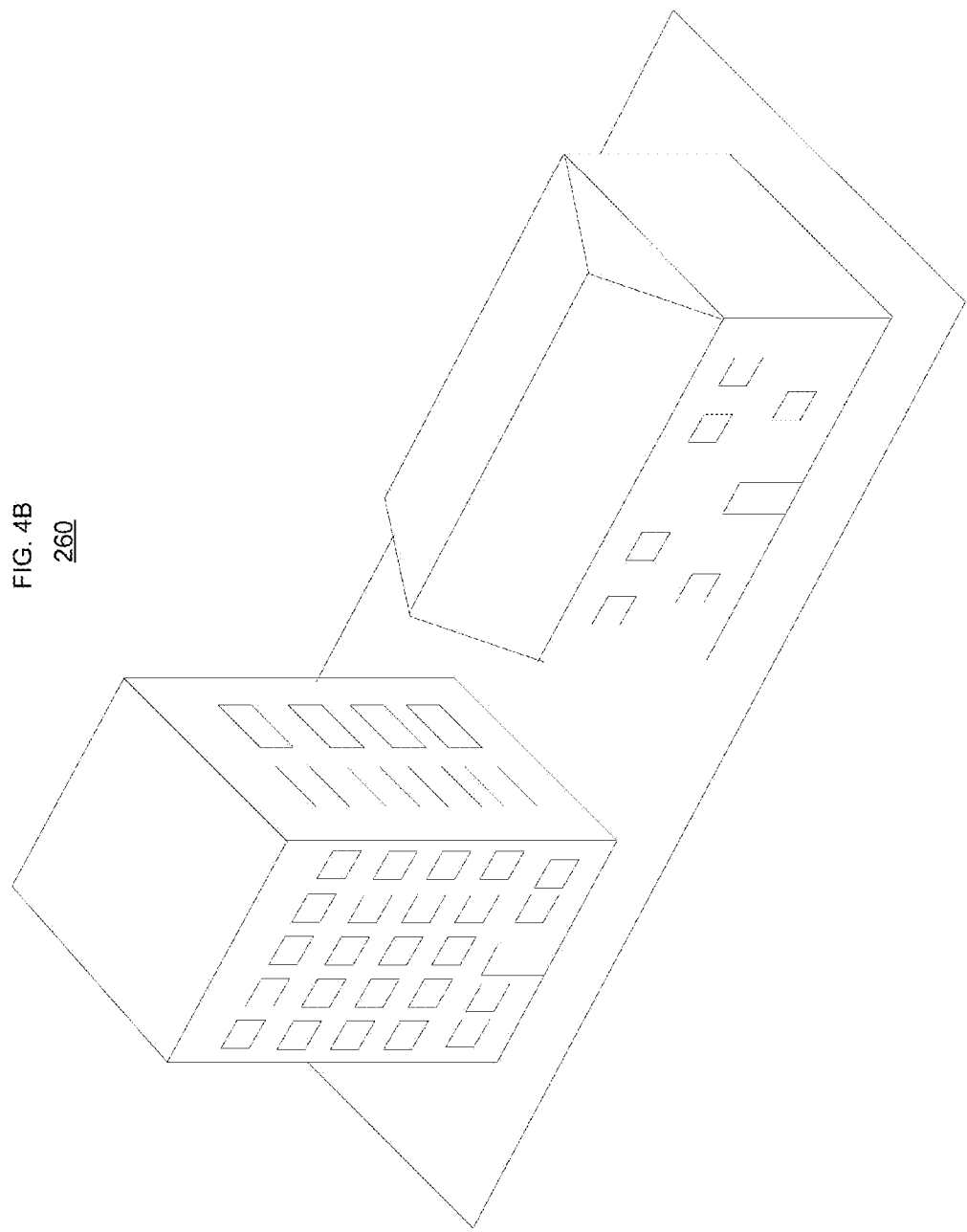

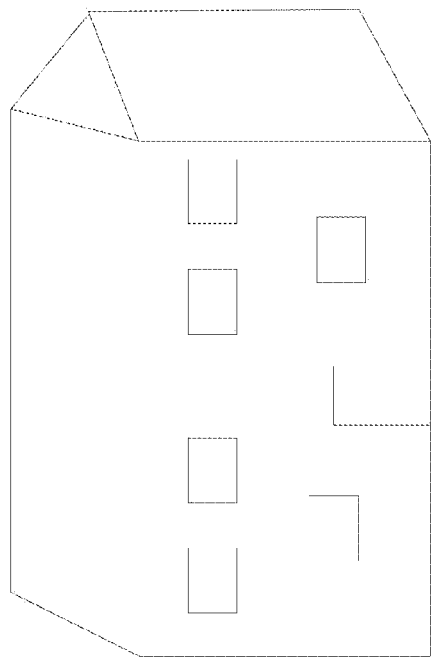
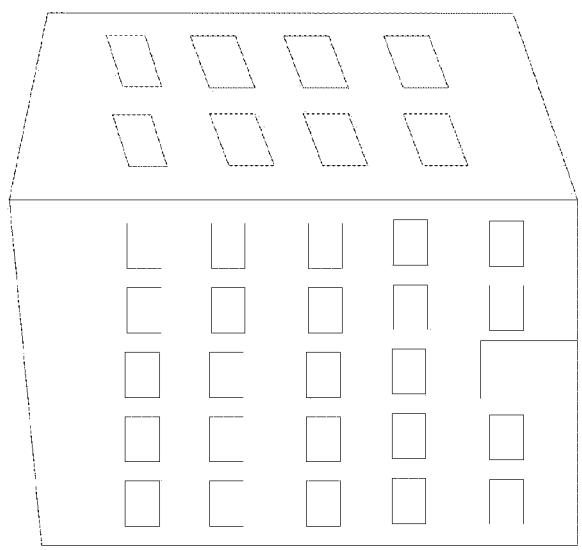
FIG. 4C
270

290

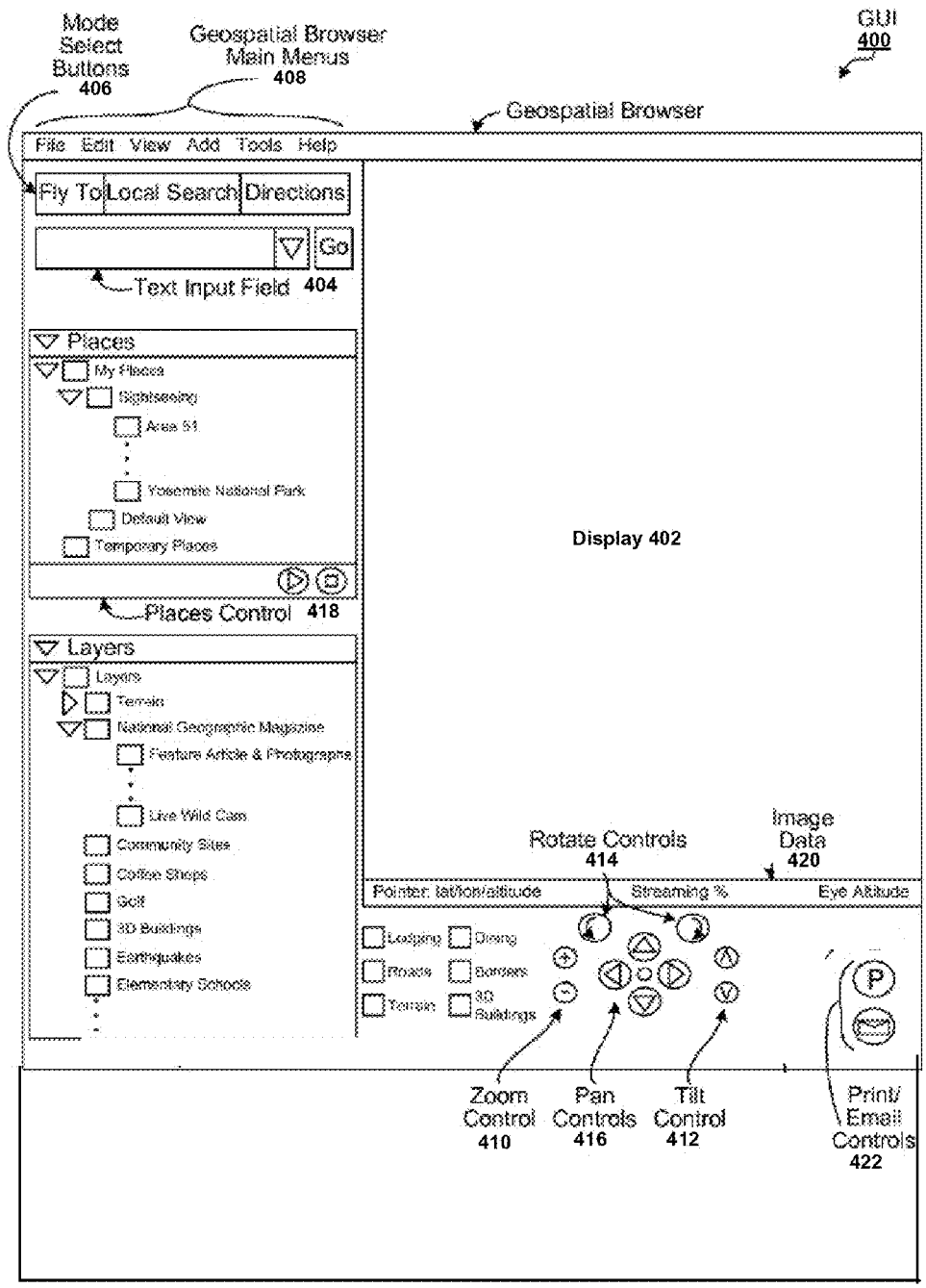

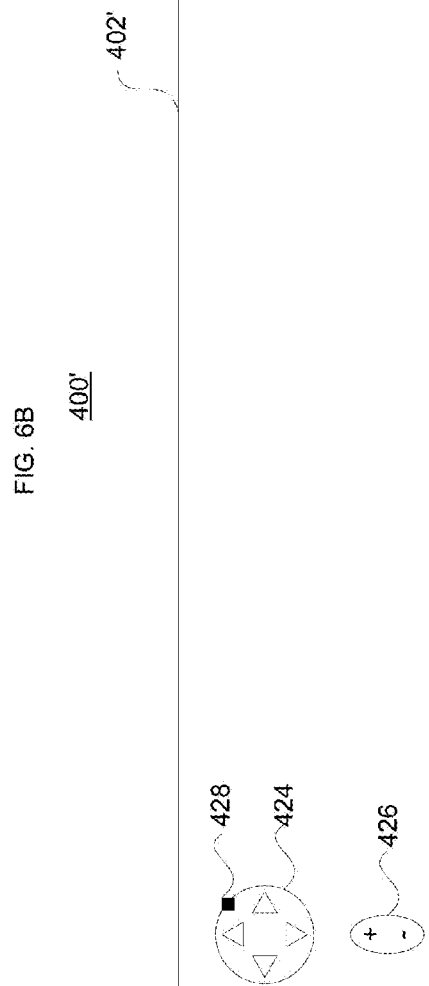

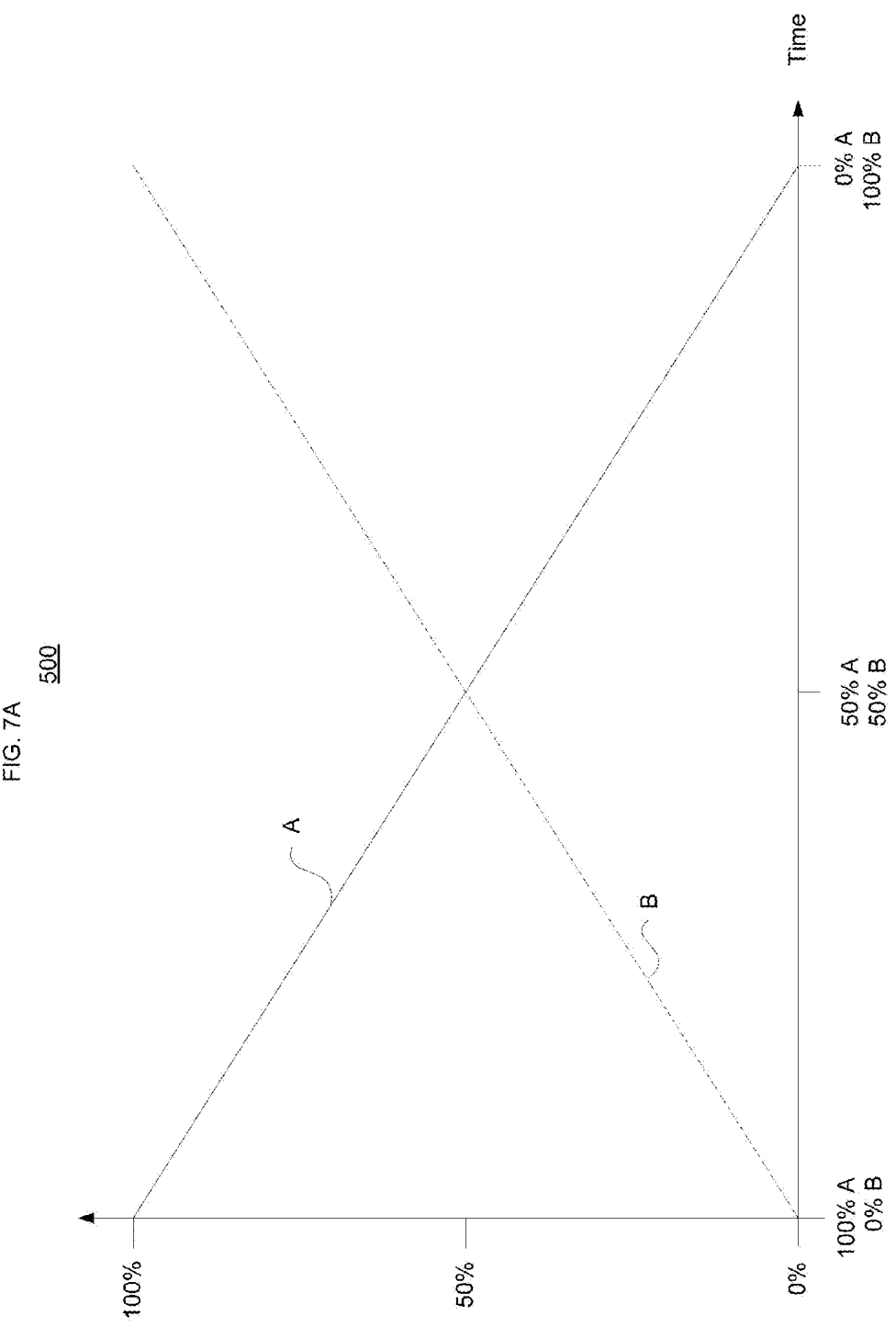

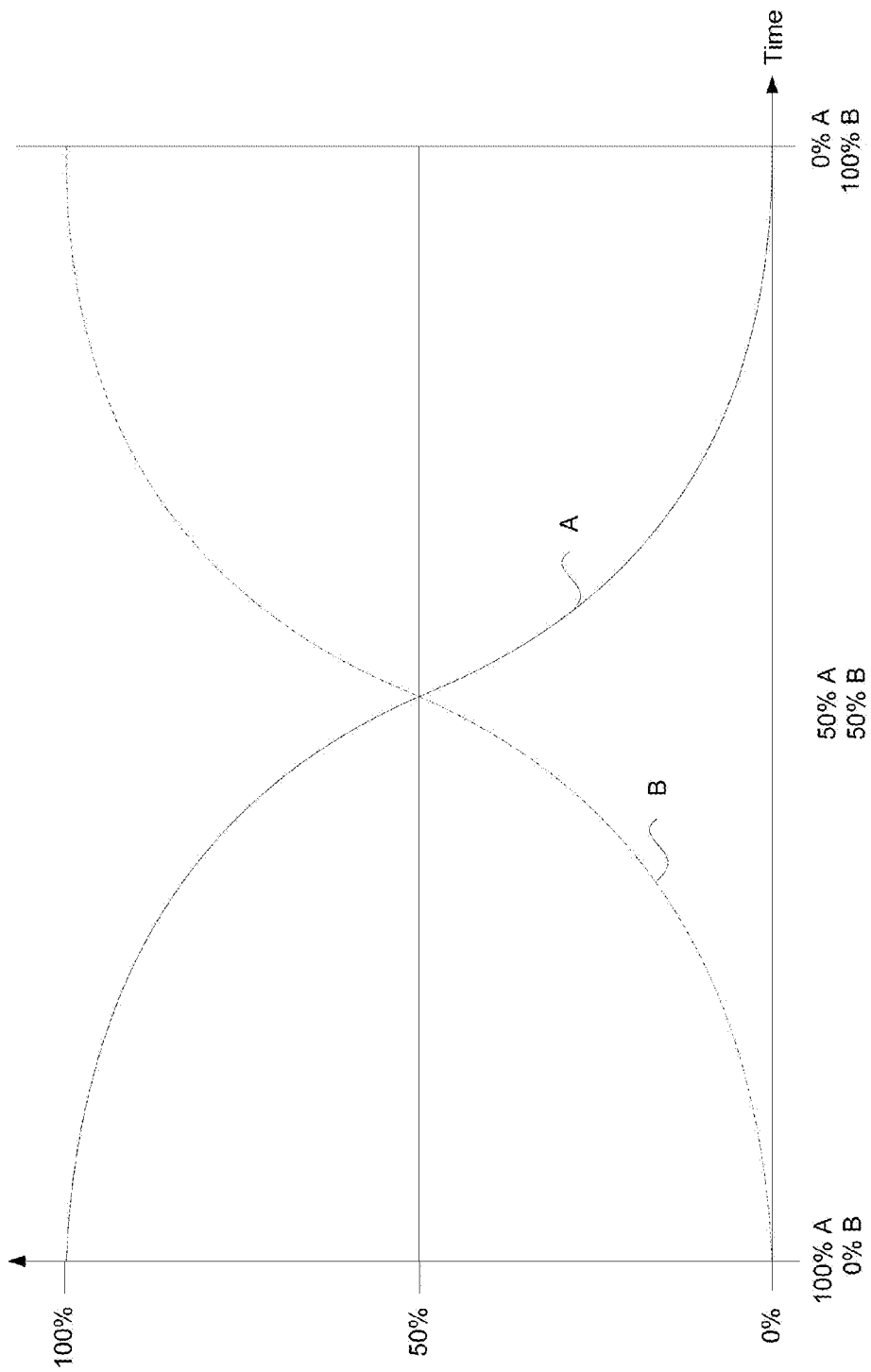

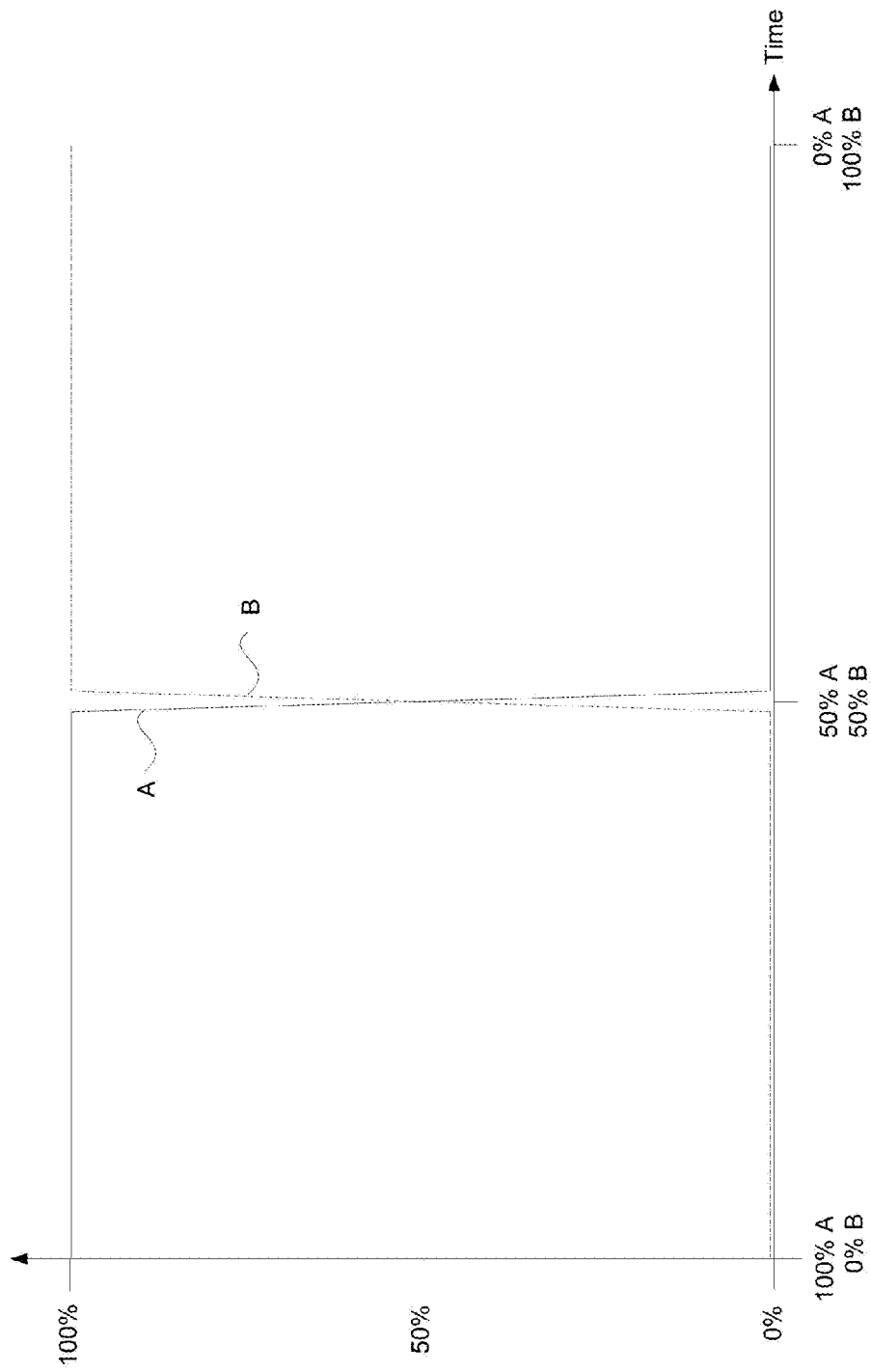

600

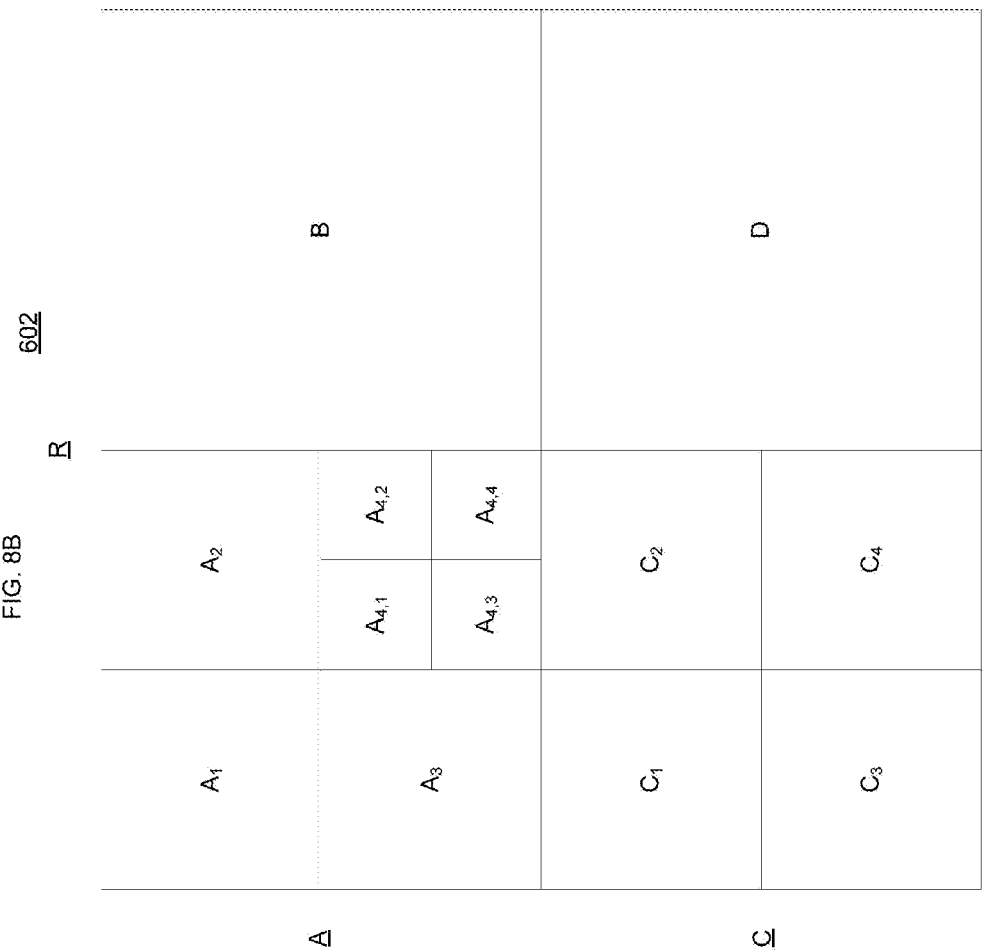

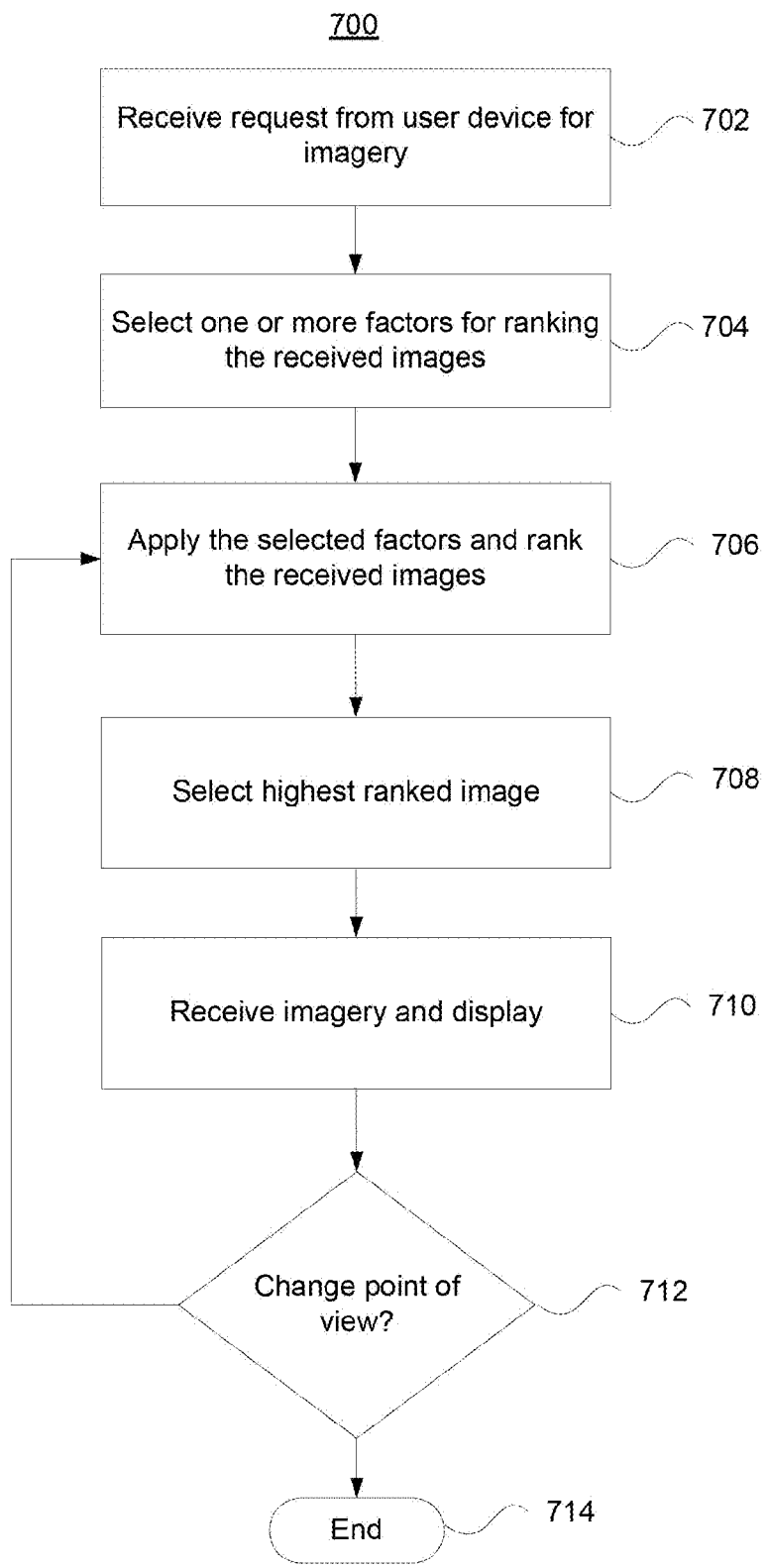

INTERACTIVE GEO-REFERENCED SOURCE IMAGERY VIEWING SYSTEM AND METHOD

BACKGROUND OF THE INVENTION

1. Field of the Invention

The present invention relates generally to image mapping systems and methods. More particularly, the present invention relates to using oblique imagery and providing smooth transitions between different images to create a three dimensional motion experience for a viewer.

2. Description of Related Art

Imagery taken by satellites, planes and other sources is used to provide visual information about the earth and different points of interest. Recently, improvements in computer processing power and broadband streaming technology have lead to the development of interactive systems for navigating imagery. Some interactive map navigation systems provide a user interface ("UI") with navigation controls for dynamically navigating cities, neighborhoods and other terrain in three dimensions. The navigation controls enable users to tilt, pan, rotate, zoom and activate terrain and buildings for different perspectives at a point of interest. An example of an interactive 3D map system for navigating Earth imagery is Google Earth™ developed by Google Inc. (Mountain View, Calif.).

The imagery used by interactive map navigation systems is typically derived by processing large pieces of geo-located imagery or "assets." Such imagery can be nadir views from the sky taken from a single pass of a satellite or an airplane, or can be stitched together from multiple aerial images. In the stitched case, typically there is a single view for every point on the ground. Once the imagery is processed, it can be moved to datacenters where it can be distributed to client devices. However, as different images are taken from different locations and orientations, there may be a loss of context or the introduction of artifacts when changing views.

SUMMARY OF THE INVENTION

Systems and methods provide a robust architecture to smoothly transition between different images and create the illusion of true three dimensional motion.

In accordance with one embodiment, a method of managing geographical imagery is provided. The method comprises receiving oblique imagery and storing the oblique imagery as unstitched oblique images in a database; associating metadata with the unstitched oblique images, the metadata including location information for each respective unstitched image; receiving a request for images, the request including a target location; comparing the target location to the location information; selecting one or more of the unstitched oblique images based upon the comparison, wherein the one or more unstitched oblique images are selected according to a ranking function associated with a point of view displayable on a client device; and transmitting the selected unstitched oblique images to the client device.

In one example, the ranking function evaluates resolution and timing information for each unstitched oblique image. In another example, the ranking function evaluates each unstitched oblique image in relation to a display resolution of the client device. In a further example, the ranking function evaluates an orientation of each unstitched oblique image. And in yet another example, the ranking function evaluates a direction of image dragging in a user interface of the client device.

In accordance with another embodiment, an apparatus for managing geographical imagery is provided. The apparatus comprises means for storing received oblique imagery as unstitched oblique images, and a processing device coupled to the storing means. The processing device is configured to associate metadata with the unstitched oblique images, the metadata including location information for each respective unstitched image; receive a request for images from a client device, the request including a target location; compare the target location to the location information; select one or more of the unstitched oblique images based upon the comparison, the one or more unstitched oblique images being selected according to a ranking function associated with a point of view displayable on the client device; and transmit the selected unstitched oblique images to the client device.

In one example, the ranking function evaluates resolution and timing information for each unstitched oblique image. In another example, the ranking function evaluates each unstitched oblique image in relation to a display resolution of the client device. In yet another example, the ranking function evaluates an orientation of each unstitched oblique image. And in a further example, the ranking function evaluates a direction of image dragging in a user interface of the client device.

In accordance with a further embodiment, a method of processing geographical imagery comprises issuing a request for images, the request including a target location; receiving a plurality of unstitched oblique images in response to the request; selecting one of the plurality of unstitched oblique images; and displaying the selected unstitched oblique image in conjunction with other imagery on a display so that the selected unstitched oblique image smoothly transitions to or from the other imagery on the display.

In one alternative, selecting the unstitched oblique image includes ranking the plurality of received unstitched oblique images according to at least one factor and choosing one of the oblique images having a highest ranking. In another alternative, smoothly transitioning to or from the selected unstitched oblique image includes performing a blending function. In a further alternative, the target location is located in an approximate center of the received plurality of unstitched oblique images. In yet another alternative, displaying the selected unstitched oblique image in conjunction with other imagery includes orbiting around the target location in response to a user request.

In one example, the method further comprises reissuing the requests for images upon receipt of a panning input. In another example, the method further comprises overlaying map information on the selected unstitched oblique image. And in a further example, the method further comprises adding a three dimensional depth map to the selected unstitched oblique image.

In yet another embodiment, an apparatus for processing geographical imagery is provided. The apparatus comprises means for issuing a request for images, the request including a target location; means for receiving a plurality of unstitched oblique images in response to the request; means for selecting one of the plurality of unstitched oblique images; and means for displaying the selected unstitched oblique image in conjunction with other imagery on a display so that the selected unstitched oblique image smoothly transitions to or from the other imagery on the display.

In one alternative, the means selecting the unstitched oblique image ranks the plurality of received unstitched oblique images according to at least one factor and chooses one of the oblique images having a highest ranking. In another alternative, the means for displaying smoothly transitions to or from the selected unstitched oblique image by performing a blending function. In an example, the target location is located in an approximate center of the received plurality of unstitched oblique images. And in a further example, the means for displaying the selected unstitched oblique image in conjunction with other imagery enables orbiting around the target location in response to a user request.

BRIEF DESCRIPTION OF THE DRAWINGS

FIG. 1 is a flow diagram in accordance with aspects of the present invention.

FIG. 2 illustrates an exemplary image in accordance with aspects of the present invention.

FIGS. 3A-D illustrate various image sources for use in accordance with embodiments of the present invention.

FIGS. 4A-D illustrate imagery examples in accordance with aspects of the present invention.

FIGS. 6A-B illustrate user interfaces for use with aspects of the present invention.

FIGS. 7A-C illustrate blending functions in accordance with aspects of the present invention.

FIGS. 8A-B illustrate a quadtree hierarchical spatial data structure and tile generation for use with aspects of the present invention.

FIG. 9 is a flow diagram of a ranking process according to aspects of the present invention.

DETAILED DESCRIPTION

Figure 4A:
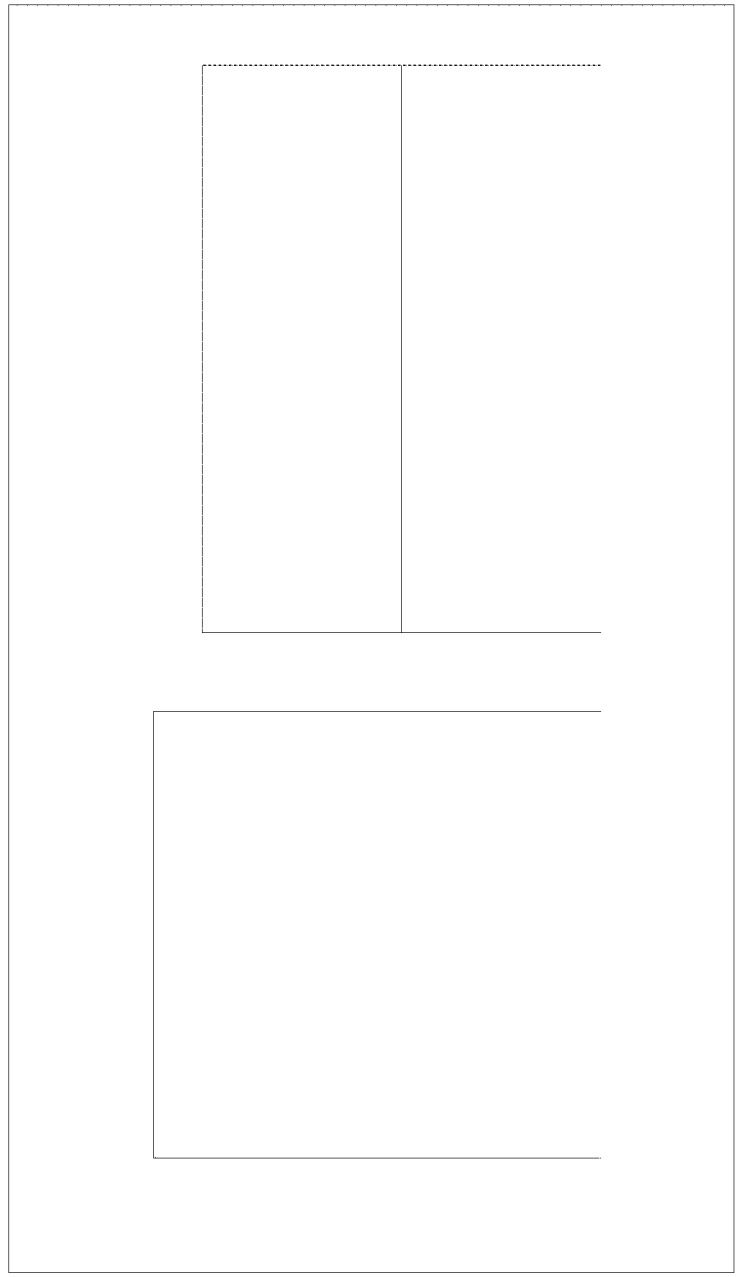

The aspects, features and advantages of the present invention will be appreciated when considered with reference to the following description of various embodiments and accompanying figures. The same reference numbers in different drawings may identify the same or similar elements. The features of all embodiments, unless expressly stated to the contrary, may be used with any other feature of other embodiments. Furthermore, the following description does not limit the present invention; rather, the scope of the invention is defined by the appended claims and equivalents.

In accordance with aspects of the present invention, images having different viewpoints about a target location are integrated to provide the experience of three dimensional motion. FIG. 1 illustrates an exemplary process 100 for obtaining and handling images associated with a target location. Source images are desirably processed upon acquisition. Imagery stored in a database may be selected and provided to a user in response to different queries.

The process 100 includes block 102, where the imagery (e.g., satellite images, aerial photographs and ground level photographs) are obtained. Imagery such as satellite images or aerial photographs or street level pictures may be obtained from different sources for many places around the world. Governments have used satellites since the 1960s to take images of the Earth. More recently, commercial satellites have also generated images of the Earth. Imagery from different sources may be collected and stored in an image database.

Each image may have metadata associated with it. Metadata may include location information such as absolute height and/or the height above ground level for the area that the image shows. It may also include depth data, such as per pixel of the image, as well as information about the camera which captured the image, such as the location and orientation of the camera (camera extrinsics) and resolution, focal length, distortion (camera intrinsics), etc. Other metadata may include date and/or time data, which can be used to identify when the image was taken (e.g., season or morning/afternoon), image orientation, etc. The metadata may be identified and stored as shown in block 104.

As shown in block 106, one or more "tiles" may be generated from the imagery. Tiles represent a section of imagery at a particular resolution. For instance, each image may be subdivided into rectangular grids of various resolutions. In one example, images may be divided into tiles which are processed independently, for example in a parallel processing infrastructure. The tiles may be stored so tiles that include imagery for geographic locations that are close to each other have a high probability of being stored on the same machine or in the same machine cluster to reduce the overhead associated with accessing information located on multiple machines. In this case, the tiles can be sized to fall within the storage constraints of the machines or a cluster of machines. Oblique images from airplanes, helicopters or other airborne platforms may be processed as tiles or stored as individual images. In another example, tiles are created from the source image pixels and are stored as images in a large database.

The actions of blocks 102-106 may be considered preprocessing, which can be performed and managed without regard to specific user queries. As shown in block 108, upon receipt of a request for imagery from a user, the system selects one or more images (e.g., tiles) and provides them to a client device for further processing and display. Appropriate images are selected using their associated metadata.

And as shown in block 110 of FIG. 1, when changing viewpoints or moving between images/tiles in an application, the system performs a blending function for the transitions between the images/tiles. Desirably this is done by the client device. By way of example only, the blending function may be performed for adjacent or overlapping tiles of a given target location. These tiles may include a generally vertical view such as from a satellite image, an aerial oblique view and a ground/street level. Once the images have been selected, they may be displayed as shown in block 112, for instance in response to a user request. As will be explained in more detail below, the user may switch between these different views and obtain a 3D-type experience in conjunction with the blending function for transitions. For instance, the imagery may be presented on a display to give the appearance that the user is flying through a 3D model of the scene.

FIG. 2 shows an exemplary image 200 which may be used in a web-based mapping application or other application. The image 200 represents a region of interest 202 including a pair of buildings 204 and 206. As shown, the region of interest 202 may be a city block, although it is not limited to a block. In other examples, regions or points of interest may be identified by a street address, GPS coordinates, a proper name (e.g., Madison Square Garden), etc.

FIGS. 3A-C illustrate how different imagery associated with the region of interest 202 may be obtained. As discussed above, such imagery may come from different sources. For instance, as shown in illustration 210 of FIG. 3A, an image may be provided by a satellite 212. This may be a nadir type image where the satellite 212 is directly or substantially vertically over the region of interest 202. The dashed lines represent the region that the satellite 212 is capturing. FIG. 3B shows an illustration 220 of an oblique image that may be taken from an airplane 222 or other source, such as a helicopter, dirigible or the like. Oblique images such as illustrated in FIG. 3B may be taken at angles between about 30 and 60 degrees relative to the region of interest 202. By way of example only, the airplane 222 may fly at an elevation on the order of 500 meters to 2000 meters to capture images. However, the height and angle of the imagery/camera may be greater than or less than these examples. And FIG. 3C illustrates an illustration 230 of a street level type image taken by a vehicle 232. Of course, instead of a vehicle, such images may be taken by pedestrians with handheld devices including cameras such as cellular phones or PDAs. Street level type images may also be taken by photographers using dedicated digital cameras. Such imaging devices may include GPS functionality and an internal compass to provide detailed camera extrinsics.

While FIGS. 3A-C illustrate image capture processes using only three different types of camera placement, it should be understood that any number of image sources may capture images from different locations and viewpoints. For instance, as shown in FIG. 3D, five cameras ("Cam1", . . . , "Cam5") having different viewpoints of the same point of interest ("Target") may be employed.

Figure 4D:
Figure 5A:
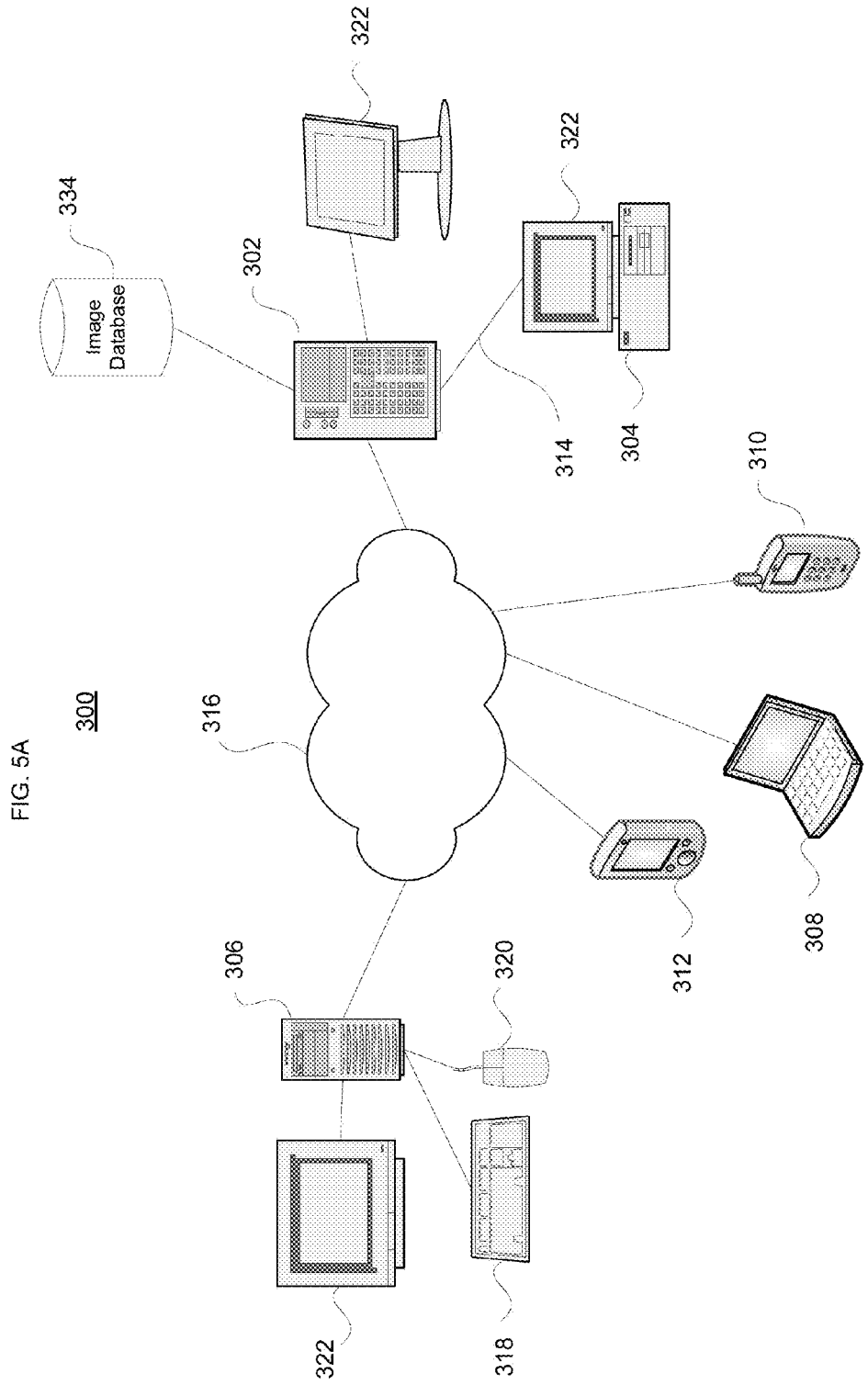
FIGS. 5A-B illustrate a computer system for use with aspects of the present invention.
Figure 5B:
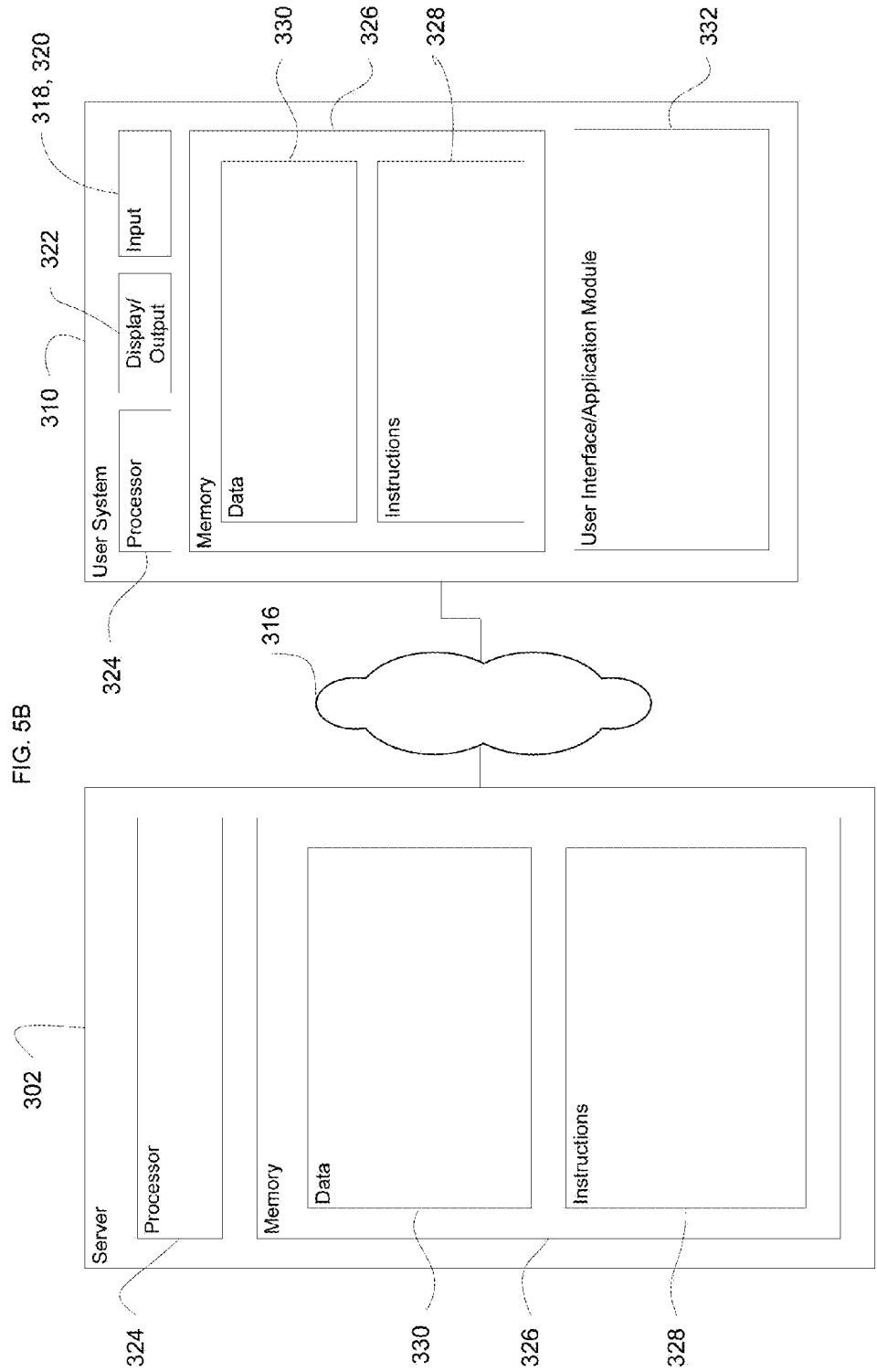

FIGS. 4A-C represent exemplary images that may be captured by the processes shown in FIGS. 3A-C. For instance, the nadir process may result in image 250 of FIG. 3A, which shows the rooftops of the buildings. Oblique image 260 of FIG. 4B correlates to the process of taking images via airplane 222 or the like. And FIG. 4C illustrates a street level or similar image 270 that may be taken by the vehicle 232 of FIG. 3C. FIG. 4D provides multiple photographs that may be captured by the cameras illustrated in FIG. 3D. As shown in FIG. 4D, the different photographs maintain the target location (e.g., a point or area of interest) in the general center of the image.

In one example, a target location may have at least 5 images or more due to overlap with adjacent points of interest. As shown in FIG. 4D, nine images of the target location are provided. The different images show different perspectives of the target location and may be considered as fixed view points that a user may access.

Once imagery has been obtained, there are different ways to process them for presentation to a user. For instance, adjacent or overlapping images may be stitched together. This technique is very useful for panning and zooming applications. Neighborhood level views of an area lend themselves to stitching, which permits smooth panning across a map. It also removes redundant data from overlapping images. However, stitching may not be beneficial when a user attempts to look at a point of interest from different angles or locations. For instance, restricted view directions, distortion and blending of artifacts may impact the presentation to the user. Thus, in embodiments discussed below, unstitched oblique images are used when transitioning among different views of a target location.

As used herein, unstitched obliques comprise oblique images that are provided for viewing without stitching or reprojection. Such oblique images are also do not constrain the view to be along the 4 cardinal axes, North, South, East and West.

Unstitched oblique images offer a compelling and intuitive browsing experience, allowing the user to zoom and pan, as well as rotate or "orbit" around a target location. Artifacts introduced by stitching are avoided, and more view angles are available for presentation than with a stitched "carpet" of images. Using unstitched obliques also permits the application to display overlaid information such as roads and search results, or to add a three dimensional depth map to the oblique image(s). Furthermore, having multiple views of the same target location helps users keep the images in context when using navigation tools. The loss of context can be further reduced by introducing smooth transitions between changes of views.

Another benefit of unstitched obliques is that such imagery can be acquired incrementally. Initially an area may only have very few oblique images. Additional obliques may be acquired over time and integrated into the imaging architecture without having to reprocess tiles or restitch carpets of images. Furthermore, unstitched obliques need not be acquired through an axis-aligned flight pattern to be usable.

In accordance with one aspect of the invention, a user interface allows a user to transition among different images/tiles for a given point of interest. The user interface enables the user to move from one viewpoint to another with a smooth transition that keeps the point of interest stationary in the center of the display. This gives the user a sense that they are actually moving in 3D when changing viewpoints, for instance when orbiting around a point of interest. These transitions desirably incorporate one or more unstitched oblique images when changing the view.

In order to achieve this type of interaction, the system employs different data relating to the imagery. The data desirably includes the image data itself (e.g., oblique images), camera information for each image, and terrain data in the vicinity of the point of interest. The system itself may include an image server and one or more client devices which have user interfaces for requesting tiles/imagery from the server and providing a resultant display to the user.

Different architectures may be employed to achieve such results. For instance, FIG. 3A presents a schematic diagram of a computer 300 system depicting various computing devices that can be used alone or in a networked configuration in accordance with aspects of the present invention. This figure illustrates a computer network 300 having a plurality of computers 302, 304, 306 and 308 as well as other types of devices such as portable electronic devices such as a mobile phone 310 and a PDA 312. The computer processing systems may be interconnected via a local or direct connection 314 and/or may be coupled via a communications network 316 such as a LAN, WAN, the Internet, etc. and which may be wired or wireless.

Each computer processing system can include, for example, one or more computing devices having user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 206 and 308 may be a personal computer, server, etc. By way of example only, computer 302 may be a server, computers 304 and 306 may be personal computers and computer 308 may be a laptop. As shown in FIG. 3B, such devices (as well as mobile phone 310 and PDA 312) desirably contain a processor 324, memory 326 and other components typically present in a computer.

Memory 326 stores information accessible by processor 324, including instructions 328 that may be executed by the processor 324 and data 330 that may be retrieved, manipulated or stored by the processor. The memory may be of any type capable of storing information accessible by the processor, such as a hard-drive, ROM, RAM, CD-ROM, Blu-Ray™ disc, flash memories, write-capable or read-only memories. The processor 324 may comprise any number of well known processors, such as processors from Intel Corporation or Advanced Micro Devices. Alternatively, the processor may be a dedicated controller for executing operations, such as an ASIC.

The instructions 328 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 330 may be retrieved, stored or modified by processor 324 in accordance with the instructions 328. The data may be stored as a collection of data. For instance, although the invention is not limited by any particular data structure, the data may be stored in computer registers, in a relational database as a table having a plurality of different fields and records, XML documents, or flat files. As will be explained in more detail below, certain image-related data may be stored in flat files such as keyhole flat files ("KFF"). Alternatively, image data may be stored as JPEG image files. In this case, metadata may be stored in binary form in a disk-based database.

The data may also be formatted in any computer readable format. Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 324 and memory 326 are functionally illustrated in FIG. 3B as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 302 communicates with one or more client computers 304, 306 and/or 308, as well as devices such as mobile phone 310 and PDA 312. Each client computer or other client device may be configured similarly to the server 302, with a processor, memory and instructions, as well as one or more user input devices 318, 320 and a user output device, such as display 322. Each client computer may be a general purpose computer, intended for use by a person, having all the components normally found in a personal computer such as a central processing unit ("CPU"), display, CD-ROM, DVD or Blu-Ray drive, hard-drive, mouse, keyboard, touch-sensitive screen, speakers, microphone, modem and/or router (telephone, cable or otherwise) and all of the components used for connecting these elements to one another. Moreover, each client device may include a user interface/application module 332 that receives input from the input devices and provides an output via the display 322 or other means, such as by a sound device such as a speaker or transducer.

The server 302 and client computers and other devices are capable of direct and indirect communication with other computers, such as over network 316. Although only a few computing devices are depicted in FIGS. 3A and 3B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Server 302 may be a web server. Although certain advantages are obtained when information is transmitted or received as noted above, other aspects of the invention are not limited to any particular manner of transmission of information. For example, in some aspects, the information (e.g., a program or imagery) may be sent via a computer-readable recording medium such as a disk, tape, CD-ROM, DVD, flash memory, etc., or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 312 and Internet-capable wireless phones such as mobile phone 310. Devices configured with wireless connectivity may include at least one antenna and a transmit and receive chain (transceiver). The specific configuration may depend upon the type of wireless connectivity, e.g., cellular, PCS, Bluetooth, 802.11 wireless LAN, etc.

Returning to FIG. 3A, the network 300 may also include an image database 334. The image database 334 may be directly or indirectly coupled to server 302. In an alternative, the image database 332 may be part of or otherwise logically associated with the server 302. The image database 334 may store data 330 in one or more KFFs. The data may include satellite data, aerial oblique photographs, digital maps, and metadata such as elevation data, GPS coordinates, date/time information, etc. from one or more sources (not shown). Furthermore, each client device (e.g., computers 304, 306 and 308, as well as mobile phone 310 and PDA 312), may include or run application software such as a geospatial browser, which may include a mapping module. The application software may be implemented as part of the user interface 332.

In one embodiment, the server 302 is a geospatial server that sources oblique and other images. A user of a client device such as mobile telephone 310 or PDA 312 may select a target location (e.g., a point or area of interest) with an application on the client device. The application may be, for example, Google Maps or Google Street View. In response to the target location request from the client device, the geospatial server may identify one or more cameras that "see" the point of interest. Each camera preferably has enough information associated with it (e.g., location, orientation, resolution) so that the server can access image tiles and also obtain a rough terrain model near the point of interest. Some or all of this information is provided to the client device.

In one example, an application on the client device filters the information received from the geospatial server to obtain the results which are most relevant and also choose a best one. The user may switch among different views, for instance from a street level view to an oblique view to a nadir view to another oblique view, using the user interface. Switching may happen during a zooming operation or by explicit selection. When moving among different views, the application on the client device shows the closest matching oblique image to the user. As the user interacts with the displayed image, he or she may use one or more user interface inputs (e.g., mouse, keyboard, touch screen) to change views. The application transitions smoothly to the next most suitable image. In one example, the user is always aligned with a given view (image); however, he or she may go to adjacent views or new target locations by appropriate selections using the user interface. As will be explained in more detail below, transitions between views may be performed with fades that reduce visual artifacts.

As noted above, a given client device may include or run application software such as a user interface. Desirably, the application implements a geospatial browser, which may include a mapping module. FIG. 6A illustrates one particular embodiment of a geospatial browser GUI 400 for use in accordance with aspects of the present invention. The GUI geospatial browser 400 includes a display 402 for displaying 2D or 3D maps, as well as a text input field 404 for entering location information such as latitude and longitude, an address and/or zip code, or the name of a well-known site (e.g., "Madison Square Garden"). The GUI 400 may include a number of modes in which it can operate, including Fly To mode, Local Search mode, and Directions mode, as shown by mode select buttons 406, which may be part of the geospatial browser main menu 408.

GUI 400 may also include a zoom control 410 for adjusting the viewing altitude, a tilt control 412 for adjusting the viewing angle, rotation controls 414 for rotating the view left and right, and/or a set of panning controls 416 to view areas of the 2D or 3D map to the left, right, top or bottom of the display window.

GUI 400 may also includes a places control 418, which allows the user to organize saved data in a Places panel in a way similar to how a user would organize files and folders on a computer's hard drive. For example, the places control 418 allows the user to create folders, reorder placemarks or folders, rename a placemark or folder, remove/delete a placemark or folder, and empty a folder's contents. Also, the user can select (e.g., check box or other such GUI control mechanism) various places designated in the places control 418, and then select a "play" function button (lower right of places control panel) so that a virtual tour of those selected places may then be displayed on display 402. Stop and pause functions can also be provided to give the user more control over a virtual tour.

GUI 400 of this example may also display image data 420 in the lower portion of the display window 1002, including pointer/cursor coordinates (e.g., latitude/longitude/altitude), streaming percentage completion, and eye altitude (e.g., feet). The GUI 400 may further includes print and email controls 422 (so as to allow for printing and emailing of locations and/or images).

The geospatial browser main menu 408 may include a File menu (e.g., functions such as Open, Save, Save As, Email/Email View, Share with Online Community, Print, Logout), an Edit menu (e.g., includes functions such as Find in Places, Find Next, Find Prey, Copy, Snapshot View, Past Delete, Rename, Refresh, Apply Style Template, Delete Content, Save to My Places, Clear Search History, and Properties), a View menu (e.g., includes functions and selectable display features such as Full Screen, View Size, Compass, Status Bar, Lat/Lon Grid, Overview Map, and Play Tour), an Add menu (e.g., includes functions to allow the addition of Placemarks, Folders, Image Overlays, and Network Links), a Tools menu (e.g., includes selectable tools such as Navigation panel, Places panel, Layers panel, Measuring tool, and Web Search panel), and Help (e.g., includes access to online help center and other informative sources).

Numerous user interface configurations and underlying functionalities will be apparent in light of this disclosure, and the present invention is not intended to be limited to any one particular configuration. The displayed 2D or 3D maps may be manipulated using the GUI 400. For instance, the GUI 400 may be used to reposition the current map view, for example, by clicking and dragging in the display window 402. A user may also select a target location and move around the target location in a 3D manner using the oblique views as discussed herein.

FIG. 6B illustrates another embodiment of a geospatial browser GUI 400' for use in accordance with aspects of the present invention. The GUI geospatial browser 400' includes a display 402' for displaying 2D or 3D maps, as well as controls 424 and 426. In one example, control 424 enables a user to tilt and pan the imagery presented on display 402'. Control 426 enables zooming in or out of the imagery. An indicator 428 may show where north is in relation to the orientation of the image.

Applications implementing a user interface capable of receiving and displaying unstitched oblique images may be stand along applications or modules in existing applications such as Google Earth or Google Street View. In one example, when unstitched oblique imagery is available, a thumbnail of an oblique picture containing the current user position may be provided on the display of the client device. The user may click on the thumbnail and enter a mode whereby unstitched oblique pictures can be viewed.

In this case, the user is able to pan and zoom, as well as rotate or "orbit" the view around a target point of interest. For instance, the point of interest may be a building, an arena, a monument, etc. Using a GUI as discussed above, the user may orbit the point of interest as though he or she were hovering or moving around the point of interest in a helicopter. Desirably, the user point of view is snapped to the most relevant image. Here, the most relevant image may be updated each time the point of view of the user changes.

A ranking function may be used to order images in terms of relevance. Relevance is desirably measured with respect to the user's point of view. The context of a query (e.g., for a point of interest) may also be used in the ranking function. Different factors may be used in the ranking function. For instance, one factor is the proximity of the current user camera direction to the image camera direction. Images whose buildings or other features would look upside-down in the current user camera view would be ranked lower than other images. Another factor is the fraction of the viewport that would be covered by the image when viewed through the user camera. This accounts for the fact that images have a finite extent because oblique images are unstitched. Images having limited coverage are given a low rank. Yet another factor is the direction of dragging in the user interface. Other factors may include an index of image quality or the time/date stamp of the image. In the latter case, newer images are ranked higher than older images. A further factor is the resolution of the imagery. For instance, the higher the resolution, the higher the ranking. An additional factor includes selecting images depending on the type of destination device, including the resolution of the display. Here, a mobile phone with a small or low resolution screen may be sent one set of imagery, while a desktop computer with a large high definition screen may be sent another set of imagery. During operation, the application preferably computes the ranking function for all images available for the current area (all images potentially relevant to the user point of view). The highest ranked image(s) is selected for rendering/display.

FIG. 9 illustrates a process 700 for performing a ranking function. As shown in block 702, the system receives a request for imagery from a client device. The request may relate to a point of interest or other location. At block 704, the factors used to rank the images are selected. This may occur in real time during the mapping process or may occur at some other time, including before a request from a client device is received. Alternatively, the selected factors are predetermined by the application. At block 706, the selected factors are applied to each image that could be displayed. These images are then ranked according to the factors as discussed above. The highest ranked image is selected in block 708. The selected image may be further processed, e.g, by rendering. The selected image is provided to the client device and displayed on the display by the UI/mapping application as shown in block 710. At block 712 the client device may determine the point of view on the display is changed in response to a user action. If so, the process may return to block 706. Otherwise, the process may terminate at block 714. In one example, as the user pans across an area, the client device automatically reissues requests for new target imagery, such as by issuing new image requests to the image server.

Smooth transitions are provided when moving between any pair or group of images. Blending is done on both source and destination images. By way of example only, this may occur when moving from a street level view to an oblique view, or vice versa. In another example, smooth transitions occur between two aerial images or two street level images. In this way, a user may freely navigate through unstitched obliques and other view without loss of context.

At noted above, stitching images together may result in distortion or the introduction of artifacts. In accordance with another aspect of the invention, different blending functions may be employed when smoothly transitioning between images of the target location. FIGS. 7A-C illustrate three different blending functions. In particular, FIG. 7A illustrates a linear transition function 500. As shown, "A" represents a first image of a target location such as an oblique image, and "B" represents a second image of the target location. B may also be an oblique image. The vertical axis in the figure represents the percentage of each image present on the display, and the horizontal axis represents the blended transition between the images over a period of time. Thus, on the left side of the transition function 500, only image A is displayed. As the view changes from A to B, there is a linear transition between the percentage of each image over time. Thus, if the transition takes 1 second, the midpoint occurs at 0.5 seconds. FIG. 7B illustrates a smooth transition function 520 having an S-curve transition rather than a pure linear transition. And FIG. 7C illustrates a step transition function 540 with little (e.g., <10%) or no blending transition between images A and B. In one example, the blending function operates as follows. Pixel values from each image are taken, multiplied with the value of their respective curve, and added together. This may be done according to the following equation:

$$P(t,x,y) = \text{factor}_A(t) * \text{pixel}_A(x,y) + \text{factor}_B(t) * \text{pixel}_B(x,y)$$

where P(t,x,y) is the pixel result, t is the transition time, and x and y are the pixel coordinates. This function is applied for all pixels of images A and B as projected on the display.

Desirably, when transitioning from one view to another, the user interface of the client device displays transitional views for short periods of time with fades according to one of the blending functions to reduce the visual artifacts.

An exemplary request for a target location may include latitude and longitude coordinates, as well as a radius or range covering the target location. The request may also include an altitude parameter, for instance to request images for the 15$^{th}$ floor of a building. The geospatial server queries the image database and obtains one or more image assets or tiles. The results may include a unique identifier for each tile of interest, location coordinates (e.g., latitude/longitude or UTM coordinates), a direction or orientation of the image, image size, zoom level(s) and height above ground level.

Figure 8A:
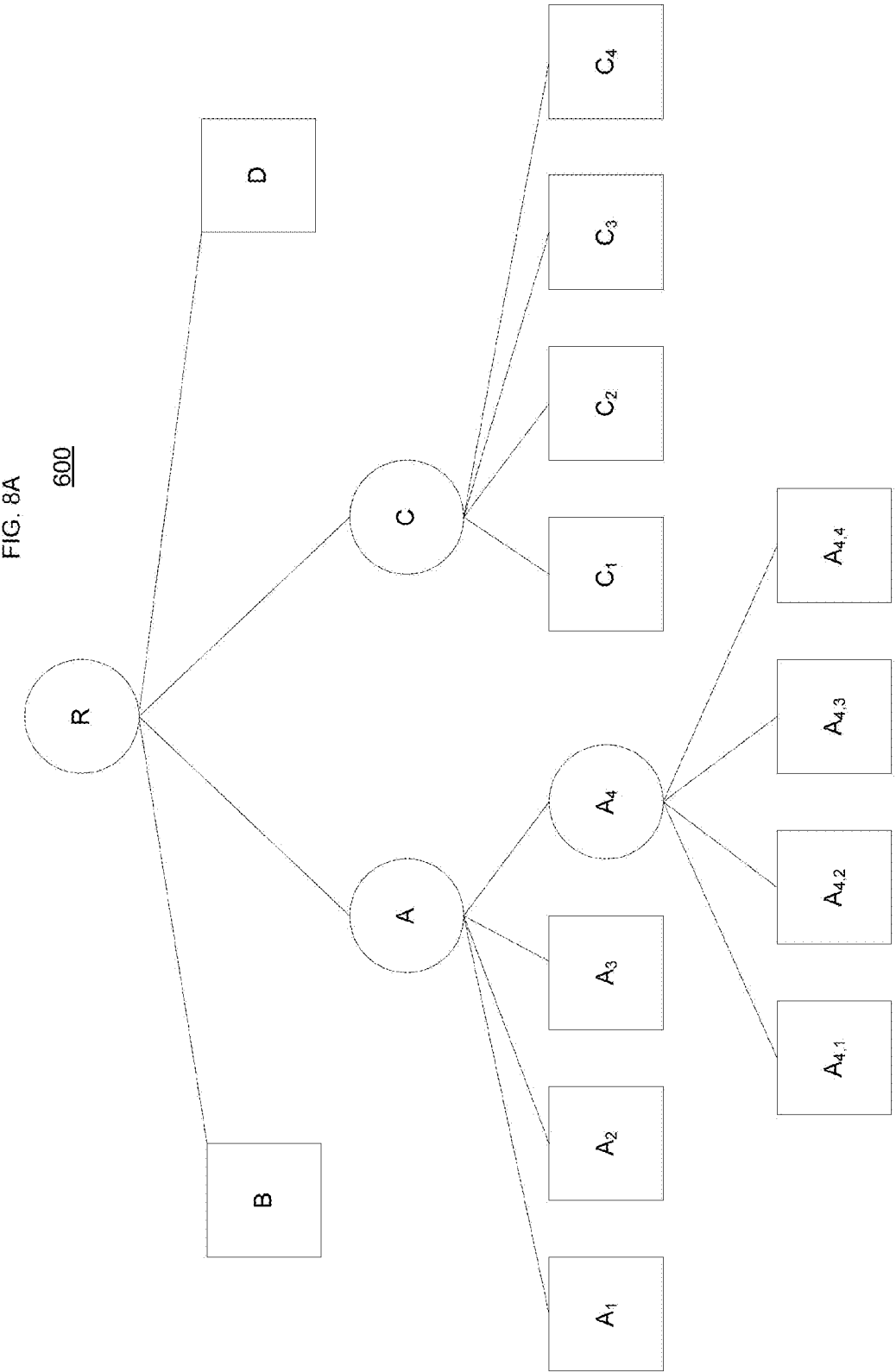

The tiles are desirably stored and indexed in a manner enabling easy access and/or manipulation. Tiles for a given region of interest may be associated with a resultant acquisition time (e.g., time of day or season), location and/or resolution. In one example, image tiles and associated data are stored in a "quadtree" structure. FIGS. 8A and 8B illustrate an exemplary hierarchical spatial data structure 600 and its application to a tile 602 of imagery. In the example shown in FIG. 8A, the hierarchical spatial data structure 600 is a quadtree. A quadtree is a rooted tree structure where every internal node includes four child nodes. In the example shown, a root node R includes child nodes A, B, C and D. Each of the internal child nodes A and C has four child nodes. For example, internal child node A has four child nodes: $A_1$, $A_2$ $A_3$, and $A_4$. Likewise, internal child node C has four child nodes: $C_1$, $C_2$, $C_3$ and $C_4$. Following this pattern, the internal child node $A_4$ has four child nodes: $A_{4,1}$, $A_{4,2}$, $A_{4,3}$ and $A_{4,4}$. While only two levels of the quadtree data structure 600 are shown, the quadtree data structure 600 can have any desired number of levels depending on the application. The quadtree data structure 600 is a well-known hierarchical data structure that has a variety of useful properties.

The quadtree data structure 600 is particularly well-suited for storing imagery and associated metadata. In the example shown, the root R of the quadtree data structure 600 can be mapped to tile 602, which is shown in FIG. 8B. The tile 602 can be further divided into four quadrants A, B, C, D, each of which can be mapped to child nodes A, B, C and D of the quadtree data structure 600. Each of the four quadrants A, B, C and D can be further divided into four quadrants and so forth. Thus, there can be a direct mapping between nodes in the quadtree data structure 600 and quadrants in the tile 602. In the example shown, the quadrants $A_{4,1}$, $A_{4,2}$, $A_{4,3}$, and $A_{4,4}$ in the tile 802 map to nodes $A_{4,1}$, $A_{4,2}$, $A_{4,3}$, and $A_{4,4}$, respectively, in the quadtree data structure 600. The nodes of the quadtree data structure 600 are referred to herein as "quadnodes."

Another hierarchical configuration which may be employed is an image pyramid. Each image of the pyramid is subdivided into one or more tiles. Selected tiles are provided to the client device for display. In one example, the image pyramid is constructed as follows. The original full size source image is divided into tile-sized pieces, for instance into blocks of 256×256 pixels each. The image factor is shrunk by a factor of two, and the new image is divided into tile-sized squares. The shrinking and dividing steps are repeated until the resulting image will fit inside the selected tile size (e.g., 256×256). If the last tile is not a square, fill pixels may be added to make it square. Here, each tile may be identified with four parameters, namely: image identifier, zoom level, and x and y coordinates.

In a given scenario, image storage and retrieval is done by the geospatial server. The client device issues requests for imagery based upon user interactions with the UI. In order to speed up processing, minimize network traffic and server load, the client device may store a cache of image tiles and/or unstitched oblique images locally.

One consideration is to understand how to render existing image information onto an oblique view. This information may be a collection of geolocated objects. To render pixel-based map tiles, the tile data may be "warped" with terrain data. A user interface application that supports 3D transitions, such as Flash from Adobe Systems, Inc. or HTML 5, is used. However, such rendering may introduce artifacts like pixilated or upside down text. It is possible to approximate the terrain with a single plane to avoid warping.

Geolocated objects may be rendered in a straightforward manner. Using terrain knowledge, the system is able to place a geolocated object at the proper place in an oblique view. The complete projection and altitude of a view are effectively known. This concept also applies to vector data. However, as oblique views may only show relatively small areas, it is not as important to created complicated curves for the warped vectors. Instead, linear segments or other types of segments over the terrain may be employed.

Any point in the world (x, y, z of a geolocated object, or any point on a line, or on a curve) may be translated into a pixel location (u, v) of the source image. Since the source image is displayed on the screen, this also means that the geolocated point can be drawn on the screen. In other words, there is a mapping between any point on in the world to a pixel on the screen. The fact that complicated curves like roads going over hilly terrain can be approximated by short straight line segments is true and allows for efficient drawing. Even surfaces in the world can be translated into areas on the screen by mapping each point of the surface to a point on the screen.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A method of processing geographical imagery, the method comprising:
   receiving, by one or more processors, a user request related to orbiting a target location;
   issuing, by one or more processors, a request for images, the request including the target location;
   receiving, by one or more processors, a plurality of unstitched oblique images in response to the request, wherein each of the unstitched oblique images represent the target location as viewed from a camera position different than the other unstitched oblique images;
   selecting, by one or more processors, a sequence of unstitched oblique images from the plurality of unstitched oblique images based at least in part on the creation of a smooth orbiting effect around the target location, wherein the target location is maintained in a general center of each of the unstitched oblique images in the sequence; and
   for each unstitched oblique images in the sequence of unstitched oblique images, providing for display, by one or more processors, the unstitched oblique image in conjunction with other imagery from different viewpoints of the target location to create an orbiting effect around the target location in response to the user request.

2. The method of claim 1, wherein selecting the sequence of unstitched oblique images includes ranking the plurality of received unstitched oblique images according to at least one factor and choosing one of the oblique images having a highest ranking.

3. The method of claim 1, wherein the smooth orbiting effect includes smoothly transitioning to or from the selected unstitched oblique image by performing a blending function, wherein the blending function is one of the following: a linear transition function, a step transition function, or a smooth transition function having an S-curve transition.

4. The method of claim 1, further comprising reissuing the request for images upon receipt of a panning input.

5. The method of claim 1, further comprising overlaying map information on the unstitched oblique image provided for display.

6. The method of claim 1, further comprising adding a three dimensional depth map to the unstitched oblique image provided for display.

7. A system for processing geographical imagery, the system comprising:
   one or more processors; and
   a memory coupled to the one or more processors, the memory including instructions capable of causing the one or more processors to:
   receive a user request related to orbiting a target location;
   issue a request for images, the request including the target location;
   receive a plurality of unstitched oblique images in response to the request, wherein each of the unstitched oblique images represent the target location as viewed from a camera position different than the other unstitched oblique images;
   select a sequence of unstitched oblique images from the plurality of unstitched oblique images based at least in part on the creation of a smooth orbiting effect around the target location, wherein the target location is maintained in a general center of each of the unstitched oblique images in the sequence; and
   for each unstitched oblique images in the sequence unstitched oblique images, providing for display the unstitched oblique image in conjunction with other imagery of the target location from different viewpoints to create the smooth orbiting effect around the target location in response to the user request.

8. The system of claim 7, wherein the one or more processors rank the plurality of received unstitched oblique images according to at least one factor and choose one of the oblique images having a highest ranking.

9. The system of claim 7, wherein the smooth orbiting effect includes smoothly transitioning to or from the selected unstitched oblique image by performing a blending function, wherein the blending function is one of the following: a linear transition function, a step transition function, or a smooth transition function having an S-curve transition.

10. The method of claim 2, wherein the at least one factor includes one of the following: image resolution, image coverage, image quality, image date stamp, or proximity of image view point to a view point of the user.

11. The system of claim 8, wherein the at least one factor includes one of the following: image resolution, image coverage, image quality, image date stamp, or proximity of image view point to a view point of the user.

12. The method of claim 1, wherein the smooth orbiting effect includes the target location remaining in an approximate center of the display.

13. The system of claim 7, wherein the smooth orbiting effect includes the target location remaining in an approximate center of the display.

14. A non-transitory computer readable medium recorded with instructions that, when executed by one or more processors, cause the one or more processors to perform a method of processing geographical imagery, comprising:
   receiving, by one or more processors, a user request related to orbiting a target location;
   issuing, by one or more processors, a request for images, the request including the target location;
   receiving, by one or more processors, a plurality of unstitched oblique images in response to the request, wherein each of the unstitched oblique images represent the target location as viewed from a camera position different than the other unstitched oblique images;
   selecting, by one or more processors, a sequence of sequence unstitched oblique images from the plurality of unstitched oblique images based at least in part on the creation of a smooth orbiting effect around the target location, wherein the target location is maintained in a general center of each of the unstitched oblique images in the sequence; and
   for each unstitched oblique images in the sequence of unstitched oblique images, providing for display, by one or more processors, the unstitched oblique image in conjunction with other imagery of the target location from different viewpoints to create an orbiting effect around the target location in response to the user request.

15. The recording medium of claim 14, wherein selecting the sequence of unstitched oblique images includes ranking the plurality of received unstitched oblique images according to at least one factor and choosing one of the oblique images having a highest ranking.

16. The recording medium of claim 14, wherein the smooth orbiting effect includes smoothly transitioning to or from the selected unstitched oblique image by performing a blending function, wherein the blending function is one of the following: a linear transition function, a step transition function, or a smooth transition function having an S-curve transition.

17. The recording medium of claim 14, further comprising reissuing the request for images upon receipt of a panning input.

18. The recording medium of claim 14, further comprising adding a three dimensional depth map to the selected unstitched oblique image provided for display.

19. The recording medium of claim 14, wherein the at least one factor includes one of the following: image resolution, image coverage, image quality, image date stamp, or proximity of image view point to a view point of the user.

20. The recording medium of claim 14, wherein the selected unstitched oblique image smoothly transitions to or from the other imagery on a display, and the target location remains in an approximate center of the display.

* * * * *